United States Patent
Wang

[19]

[11] Patent Number: 6,111,244
[45] Date of Patent: Aug. 29, 2000

[54] LONG DEPTH OF FOCUS CONTACT IMAGE SENSOR (LF-CIS) MODULE FOR COMPACT AND LIGHT WEIGHT FLATBED TYPE SCANNING SYSTEM

[75] Inventor: Weng-Lyang Wang, Saratoga, Calif.

[73] Assignee: CMOS Sensor, Inc., Cupertino, Calif.

[21] Appl. No.: 09/026,314

[22] Filed: Feb. 19, 1998

[51] Int. Cl.[7] .................................................. H01L 27/00
[52] U.S. Cl. .................... 250/208.1; 250/239; 358/497
[58] Field of Search ................................ 250/208.1, 239; 358/482, 483, 484, 474, 497

[56] References Cited

U.S. PATENT DOCUMENTS

| | | | |
|---|---|---|---|
| 5,801,851 | 9/1998 | Sheng | 358/497 |
| 5,857,133 | 1/1999 | Sun | 399/211 |
| 5,900,951 | 5/1999 | Tsai | 358/497 |
| 5,943,463 | 8/1999 | Unuma et al. | 358/119 |

Primary Examiner—Que T. Le
Assistant Examiner—Thanh X. Luu
Attorney, Agent, or Firm—Michael A. Glenn

[57] ABSTRACT

An image sensor system having very long Depth Of Focus (DOF) on the document plane and very short optical distance from the document plane to the image plane provides the advantages of both a lens reduction image sensor system and a contact type image sensor system. The inventive image sensor system thus provides a Long depth of Focus Contact type Image Sensor (Lf-cis) system that can be assembled in a compact and light weight module that is suitable for use in current image scanning systems (for example, flatbed type, paper feeder type, and handheld type). The invention also provides a compact and light weight flatbed type image scanning system. The CIS module may be modified such that two ends of the module higher than the rest of the module, a steel bracket holds the module and maintains the optical path in alignment, and a metal carriage having metal spring holds the module. The CIS module is self aligned to the bottom of the scanner glass. No optical adjustment or mechanical adjustment is required on the scanner assembly line. A central guideway and a low power stepping motor are provided to drive the entire module.

57 Claims, 18 Drawing Sheets

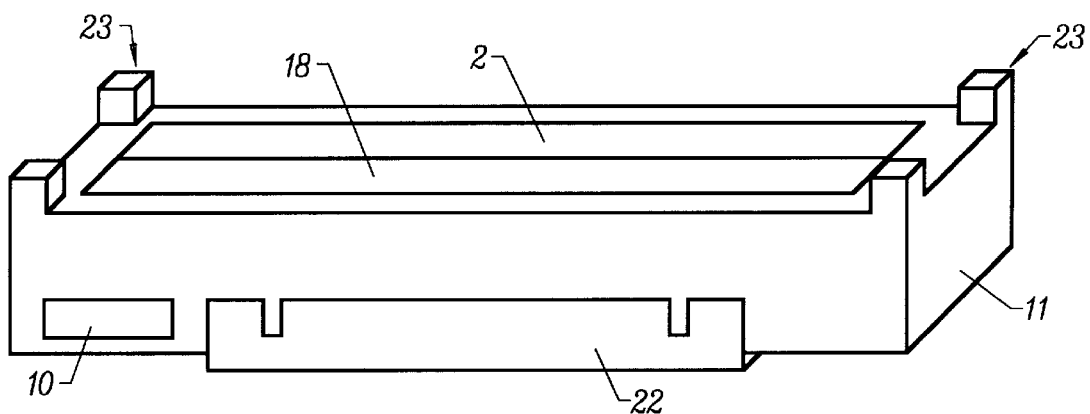
FIG. 15A
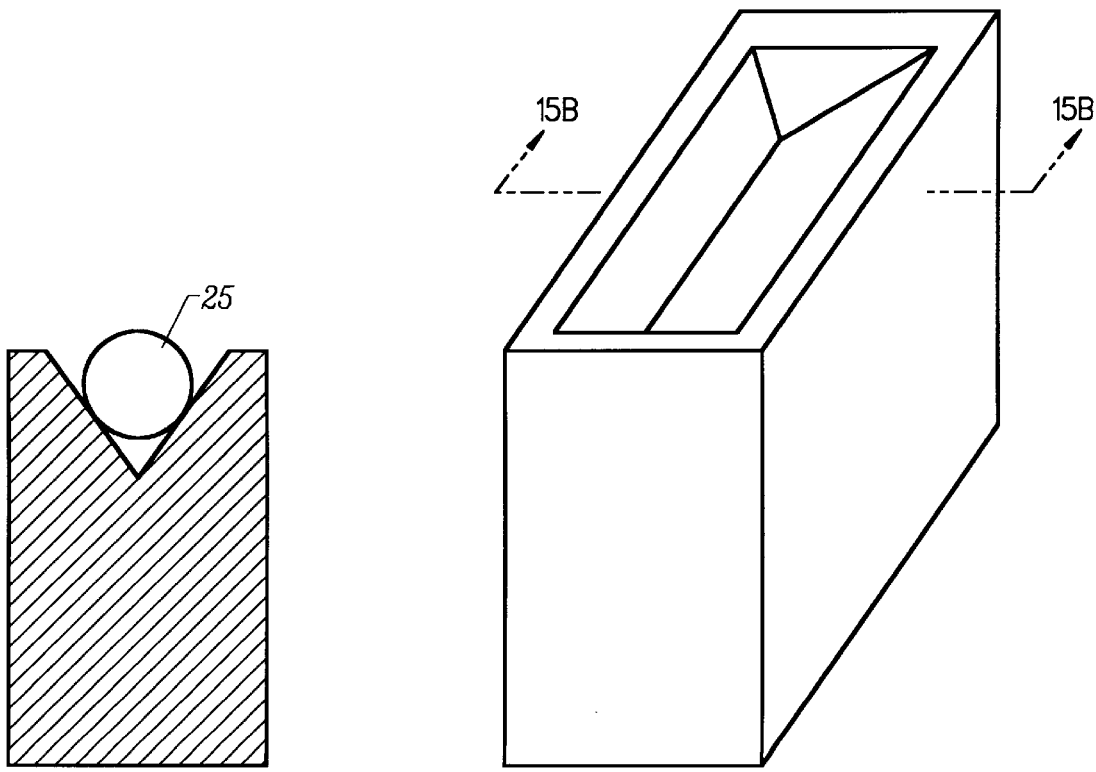
FIG. 15B
FIG. 15C

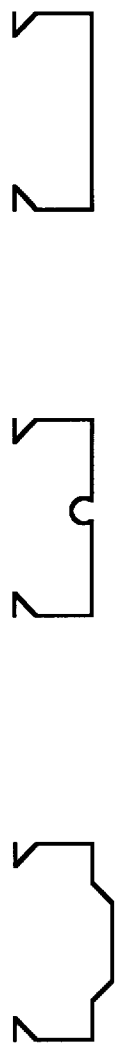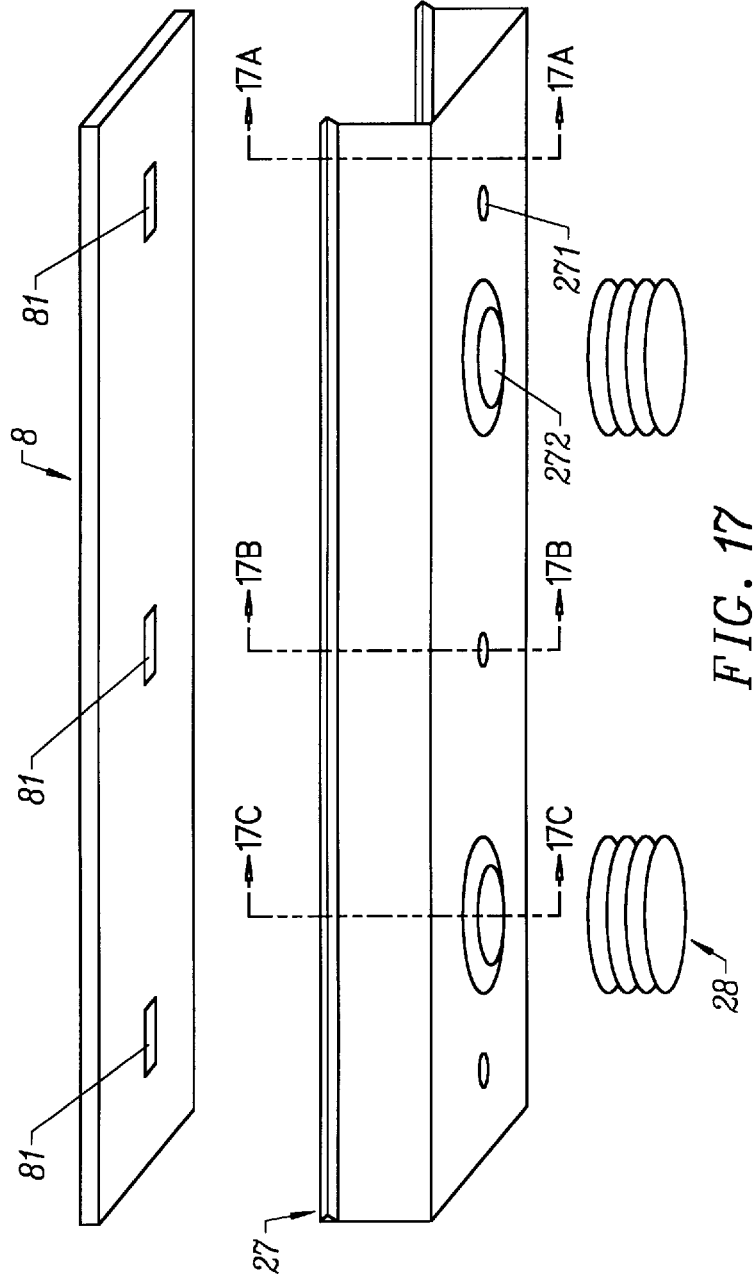

LONG DEPTH OF FOCUS CONTACT IMAGE SENSOR (LF-CIS) MODULE FOR COMPACT AND LIGHT WEIGHT FLATBED TYPE SCANNING SYSTEM

BACKGROUND OF THE INVENTION

1. Technical Field

The invention relates to image scanning systems. More particularly, the invention relates to a long depth of focus contact image sensor module for use in compact and light weight flatbed type scanning systems.

2. Description of the Prior Art

Historically, linear image sensor arrays, in a form of charge-couples device (CCD's) or self-scanned photodiode arrays (or MOS arrays), have been used to accomplish image scanning. Early prior art scanning devices required at least three essential elements to capture the image of a subject document: (1) a light source to illuminate the document, (2) an image sensor array to detect the image signal from the reflected document, and (3) a lens system to focus the image of the document on the image sensor.

Two image sensor systems had been widely used to scan a page width of a document image. They are the lens reduction image sensor system and the contact type image sensor system.

The Charge Coupled Device (CCD) image sensor has been used in the lens reduction image sensor system for more than twenty years. Because the length of a CCD image sensor is about one inch, a concave reduction lens is required to focus the image of a standard A4 paper size on the CCD array. A plastic case is used to house all of the components (e.g. CCD image sensor, reduction lens, and necessary optical path) of a CCD module. This CCD module is quite bulky and heavy because the optical distance is long (about 10–30 centimeter). Moreover, the whole module must be moved by a high power stepping motor, which typically produces jerky or uneven movement of the module, causing distortion in the image. Overall, the flatbed scanner is large and heavy.

About ten years ago, the contact type image sensor (CIS) system was designed to solve the aforementioned problem. In this system, the reduction lens is replaced by a Selfoc Lens Array (SLA) and the CCD image sensor is replaced by a full width, hybrid image sensor array. The optical distance is reduced to less than one centimeter. This system is then assembled into a compact and light weight module, i.e. a CIS module. The module has all of the elements required to capture an image.

One drawback of the CIS module is its short Depth Of Focus (DOF). The CIS module uses an SLA array to focus the document image to the image sensor. Because the DOF of the SLA array is about 0.3 millimeters, the DOF of the CIS module is about 0.3 millimeters. This problem limits the CIS's application to paper feeder type image scanning systems. The CIS module can not used on flatbed type image scanning systems because such systems need a very long DOF on the document plane.

A typical configuration of a prior art scanning device (i.e. a lens reduction image sensor system) is illustrated in FIG. 1. An original document 1 is illuminated by a light source 2. Because an ordinary CCD image sensor 3 is typically approximately one inch long, an optical lens 4 is required to reduce the image of any text or graphics on the document 1 so that a full width (about 8.5 inch) image can be received in the CCD image sensor 3. The reduction rate of an optical lens 4 depends on what kind of CCD image sensor 3 is used in the system. The optical distance ("A" cm) from the document 1 to the lens 4 is about seven to eight times the optical distance ("B" cm) from the image sensor 3 to the lens 4. Therefore, the depth of focus (DOF) on the document 1 is about seven to eight times longer than the DOF on the image sensor 3.

Because this system has a very long DOF, most of the early image scanner (both paper feeder type and flatbed type) used a lens reduction image sensor system. To obtain the necessary reduction, an optical distance of about 10 to 30 centimeters is required between the CCD image sensor 3 and the document 1. This optical separation distance necessitates a rather bulky assembly for the overall scanning device. For this reason, some prior art devices use sophisticated (hence expensive and difficult to make) folded optical schemes that add several mirrors 5 to reduce the total physical size of the assembly.

FIG. 2 shows a perspective view of a folded optical scheme for a lens reduction image sensor system. A plastic case is used to house all of the components together (e.g. CCD image sensor 3, reduction lens 4, mirrors 5, and necessary optical path) to a CCD module. The whole CCD module of the folded optical schemes or unfolded optical scheme is big, heavy, and bulky.

An improvement to the image sensor system (as discussed above, see FIG. 3) is the CIS system. In this system, the reducing optical lens is replaced by a full width Selfoc Lens Array (SLA) 6 and the CCD image sensor is replaced by a full width image sensor array 7. This system allows a one-to-one scanning of the document 1 because the SLA 6 and a full width image sensor array 7 are of the same width as the document 1 to be scanned. This arrangement allows the distance between the image sensor array 7 and the document 1 to be reduced to less than one centimeter.

A CIS module is used to integrate all of the components to a compact and light weight module. FIG. 4 is a cross section view of the prior art CIS module. The CIS module consists of: (1) a LED light source 2 to illuminate the document 1, (2) a one-to-one Selfoc Lens Array (SLA) 6 to focus the document image 1 to the image sensor array 7; (3) a hybrid image sensor board 8 which comprises a plurality of image sensor arrays 7 and its associated circuitry is used to convert an optical signal to an electronic signal; (4) a cover glass 9; (5) a connector 10 to connect the electronic signal of the module to outside circuitry; and (6) a case 11 to house all of the above components. The overall dimension of the CIS module 12 is typically less than 18×13×232 mm for A4 size paper width. The CIS module's size is small relative to that of the CCD module.

Therefore, the overall dimensions of an image scanner which incorporates a CIS module 12 are smaller than those of an image scanner that incorporates a CCD module.

Current CIS modules have a very short DOF (about 0.3 millimeter) due to the short DOF on the SLA. Normally, the DOF of the current SLA used on the CIS module is about 0.3 millimeter. This short DOF problem limits the CIS module's application on paper feeder type scanners (for example, fax machines) as opposed to flatbed type scanners (for example, copiers). FIG. 5 shows a paper feeder type image scanning system in which the CIS module 12 is fixed and the document 1 is moved by the roller 13. The document 1 is sandwiched between the roller 13 and the glass 9 surface of the CIS module 12. When the stepping motors drive the roller 13, the document 1 is moved forward simultaneously. The document 1 is pushed by the roller 13 and contacts the glass 9 surface directly. The focus point of the CIS module is adjusted to the surface of the glass 9. In this case, the image sensor array 7 is able to detect the document image 1 and prevent the short DOF problem on the CIS module.

Most paper feeder image scanning systems (for example, fax machines and sheet fed scanners) currently use CIS modules instead of CCD modules because of the CIS module's compact size and ease of incorporation into a system assembly. Paper feeder scanning systems only scan a sheet of document. A bound document (for example, a book or magazine) can not be scanned using a paper feeder scanner.

One image scanner that is able to scan a book or magazine is a flatbed type image scanning system (see FIGS. 6*a* and 6*b*). On the flatbed type image scanning system (for example, a flatbed scanner or digital copier), the document 1 is fixed between a cover plate 14 and a glass 15 surface of the flatbed scanner. The CCD module 16 is moved underneath the glass 15 forward to detect the document image 1. Normally, glass thickness variation across the whole page width of the glass plate 15 is more than 0.3 millimeter. The CCD module 16 is guided by two long stainless steel, spherical railways 17 at both ends of the CCD module 16. The two long, spherical railways 17 coupled to the CCD module 16 act like a railroad to a train. The CCD module 16 is moved forward by a gear belt which controlled by a stepping motor. The whole module has about a few tenths of a millimeter of vibration up and down on its optical path direction (vertical direction of FIGS. 6*a* and 6*b*) when the CCD module 16 is moved forward.

In addition, the document 1 that sits on the glass 15 surface is not optically flat and has a few tenths of a millimeter of surface variation. In many cases, people want to scan a book or magazine. Normally, the book or magazine has a curved surface or rough surface. When the total variation is added together, there must be at least a few millimeter of DOF for the optical distance on the flatbed scanner to detect a decent image signal on the image sensor array. A longer DOF is always better for flatbed scanner. Therefore, current CIS modules can not be used on flatbed type image scanning systems.

Flatbed scanners require a very long DOF to detect a decent image signal. Current flatbed scanners use a CCD module to capture an image because such module provides a long DOF on the document plane. Because of such module's long (10 to 30 centimeter) optical distance, current flatbed scanners are bulky and heavy (more than 10 inch wide, 15 inch long, and 4 inch high). In the current office environment, most of the workers have a computer, monitor, CD-ROM, and printer on their desk. There is not enough space to put a scanner on most of the worker's desks. For a flatbed scanner to gain the acceptance of a CD-ROM or printer in the office environment, the sizes of the flatbed scanner need to be compact and light weight, and the scanner must have a low cost. The prior art CIS module might be a candidate to reduce the size of the flatbed scanner but, because of its short DOF problem, current CIS modules cannot used on the flatbed scanner.

SUMMARY OF THE INVENTION

The invention provides an image sensor system having a very long DOF on the document plane and a very short optical distance from document plane to image plane. Accordingly, a compact image sensor module is provided using this image sensor system. An image scanning system incorporating this module is very compact light weight, and low cost.

The invention combines the advantages of both a lens reduction type image sensor system and a contact type image sensor system. Instead of using an SLA array of a contact type image sensor system and a reduction lens of a lens reduction image sensor system, the invention combines these two lenses together to form a Long depth of Focus Contact type Image Sensor system (Lf-cis). Thus, the invention provides a new system that uses four elements instead of the three elements of a conventional system to capture the image of a subject document. They are (1) a light source to illuminate the document, (2) a plano-cylindrical lens to focus the document image to the object plane of the SLA, (3) an SLA to transfer the image from object plane to the image plane, and (4) an image sensor array located on the image plane to convert from an optical image signal to an electronic signal.

The plano-cylindrical lens has an infinite DOF on the document side and a focal point on the SLA side. The Lf-cis system has a very long DOF on the document image because there is a one-to-one correspondence between the document image to the image sensor array. The optical distance of the plano-cylindrical lens is very short. Therefore, the optical distance from document plane to the image plane is kept short.

All of the components of the Lf-cis system can be assembled into a compact and light weight module. This module provides the advantages of a long DOF while maintaining a very compact size and light weight. Because the module has a long DOF and is also compact, the Lf-cis module is suitable for use on the current image scanning systems (for example, flatbed type, paper feeder type, and handheld type). The Lf-cis module has very low power consumption and is therefore useful in new applications that require low power consumption (for example, notebook scanners or portable scanners).

The invention also provides a method for designing a compact, light weight, and low cost flatbed type image scanning system for flatbed scanner or digital copier applications.

The Lf-cis system can be assembled as a compact and light weight module that provides the advantages of a long DOF while maintaining a very compact size and light weight. This module has the advantages of both a CCD module and a CIS module. Because the module has a long DOF and is also compact, the Lf-cis module is suitable incorporation into most of the current image scanners used (for example, flatbed type, paper feeder type, or handheld type).

The invention also provides a method for correcting chromatic aberration in an Lf-cis module. A right plano-cylindrical lens design is used to overcome the chromatic aberration problem found in the SLA used in prior art color CIS modules. The variation of the index of refraction of the SLA array as a function of wavelength causes three colors to obtain optimum focus at different locations. The light spectrum is separated because the shorter wavelengths (blue) are refracted or bent more than the longer wavelengths (red). Because lenses are made of glass that reflect light of varying wavelength at different angles, it is difficult to have all three colors focus at the same location. The plano-cylindrical lens design minimizes the chromatic aberration caused by an SLA. The chromatic aberration of the SLA is corrected by shifting the focus point inside the plano-cylindrical lens. The optical path of each color is adjusted to obtain optimum focus point.

The invention also provides a method for designing a compact and light weight flatbed type image scanning system (for example, a flatbed scanner or digital copier). The CIS module is modified such that (1) two ends of the module are higher than the rest of the module, (2) a steel bracket holds the module and maintains the optical path at an optimal position, and (3) a metal carriage having a metal spring holds the module. The CIS module is self aligned to the bottom of the glass. No optical adjustment or mechanical adjustment is required on the scanner assembly line. A central guideway and a low power stepping motor are provided to drive the module.

A further advantage of the invention is that the plano-cylindrical lens provides a reduction in the horizontal direction (paper length direction) and a one-to-one ratio (no reduction) in the vertical direction (paper width direction). Therefore, the optical distance from the document plane to the image plane is very short. The pixel size in the horizontal direction is reduced according to the reduction ratio of the lens.

Assuming that the reduction rate of the plano-cylindrical lens is two, the size of each pixel is reduced to two in the horizontal direction. In this case, each pixel dimension is reduced from 84.5 $\mu$m×84.5 $\mu$m to 42.25 $\mu$m×84.5 $\mu$m for 300 dpi resolution. This increases the fill factor and reduces the image sensor cost Excellent results are obtained for an image sensor array that uses an Active Pixel Sensor (APS) structure because the voltage output of the APS structure is independent of the pixel size.

Another advantage of the invention is that a stainless steel bracket is used to connect to the ground plane of the PCB on the module. Therefore, the ground plane of the CIS module can be connected to the ground plane of the scanner body, thereby preventing an Electronic Static Damage (ESD) problem with the module.

The invention also eliminates the use of two railways found on current flatbed scanners. Only one railway is required for a scanner built in accordance with the invention. A low power stepping motor is used to drive the scanner because of the scanner's compact size and light weight.

Yet another advantage of the invention is that it eliminates the cover glass on the CIS module. This feature of the invention prevents the interference problem caused by the use of two glasses on the current CIS module (one glass Is the flatbed scanner glass, the other glass is the CIS module cover glass).

BRIEF DESCRIPTION OF THE DRAWINGS

FIG. 15a is a pictorial view of the Lf-cis module showing that both ends of the module are higher than the rest of the module according to the invention;

FIG. 15b and 15c is a pictorial view of the end cap for the Lf-cis module according to the invention;

FIG. 17 is a pictorial view of a steel bracket according to the invention;

DETAILED DESCRIPTION OF THE INVENTION

Figure 1:
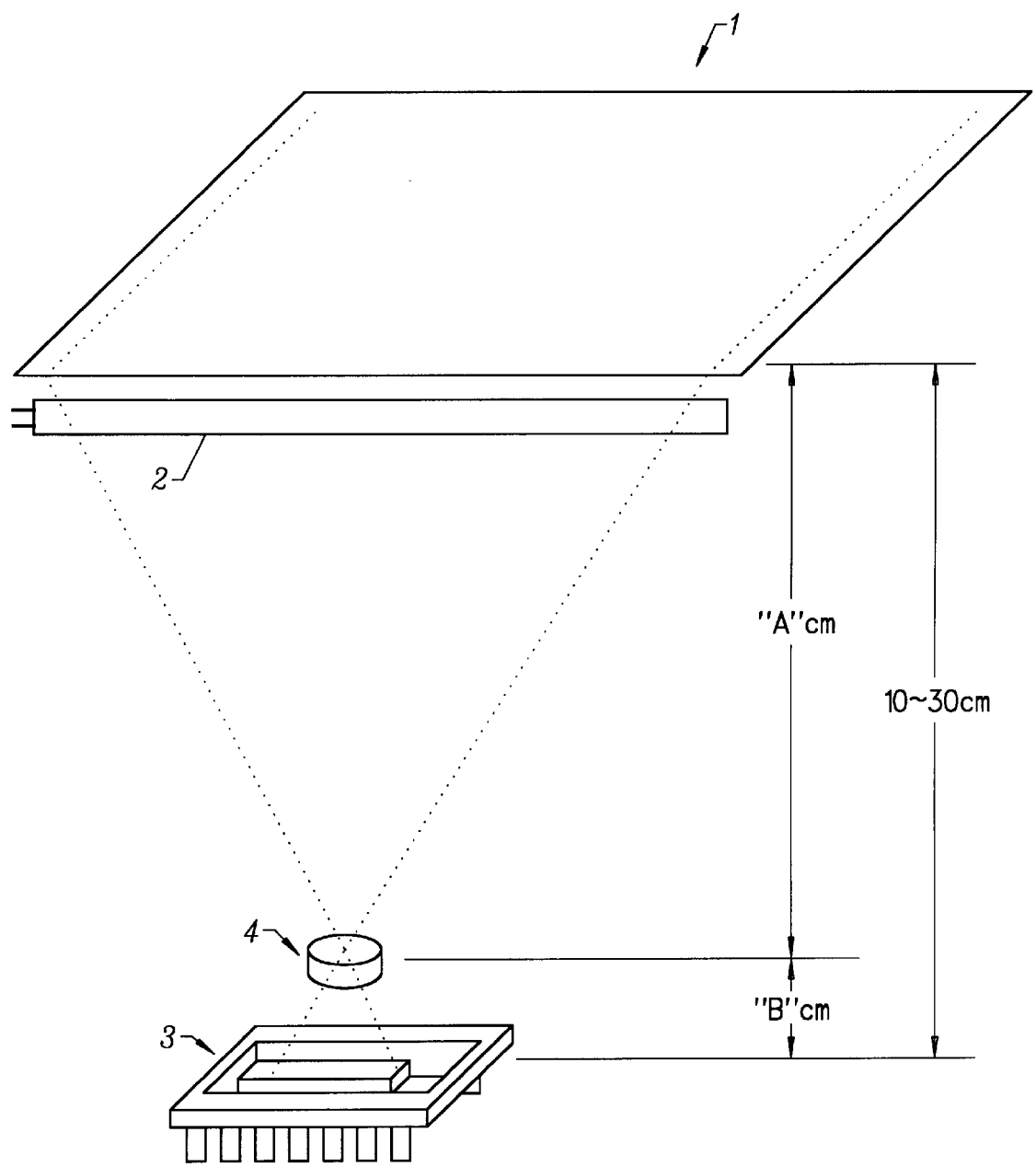
FIG. 1 is a schematic diagram of a prior art lens reduction image sensor system.
Figure 2:
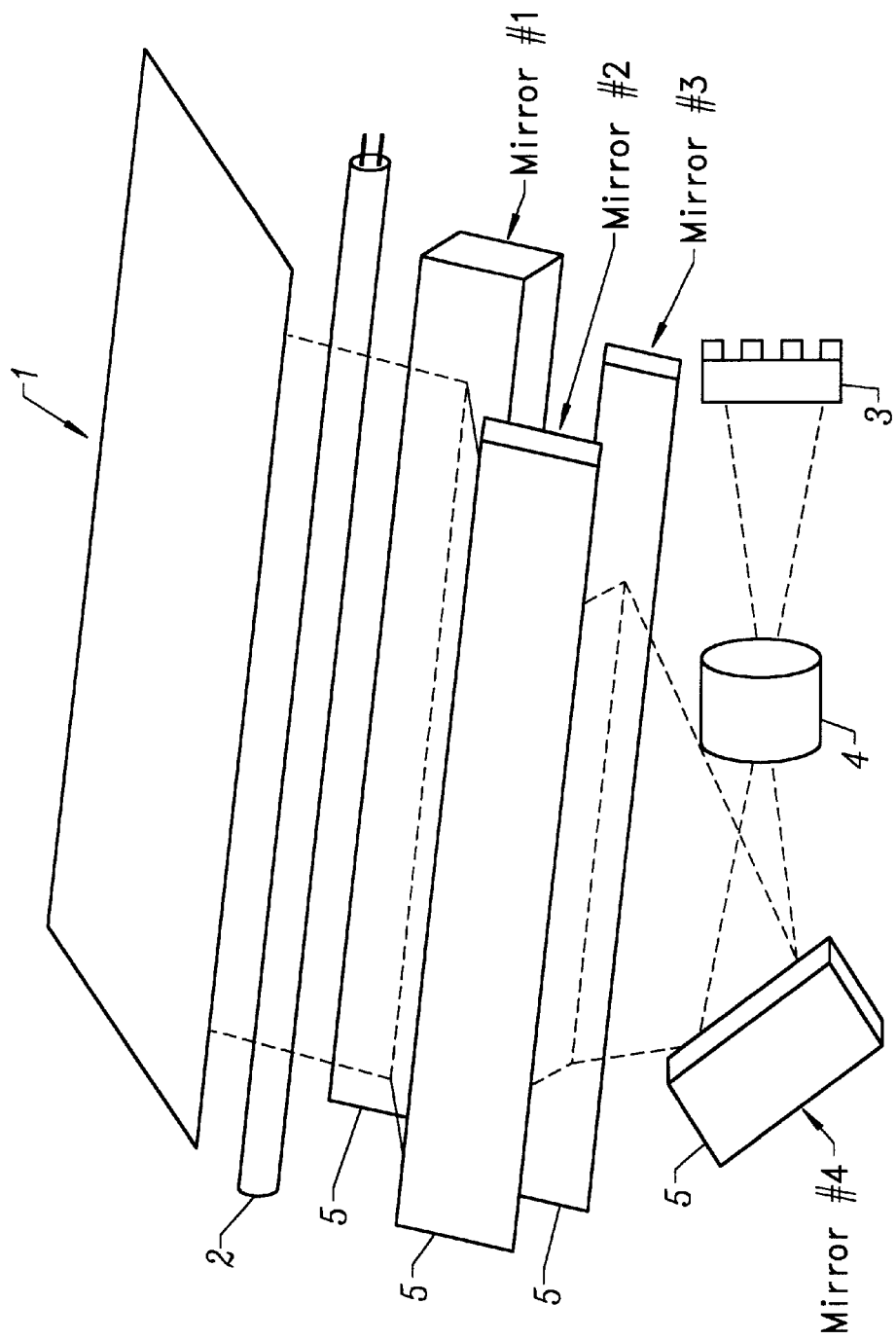
FIG. 2 is a schematic diagram of a prior art folded optical schemes on lens reduction image sensor system.
Figure 3:
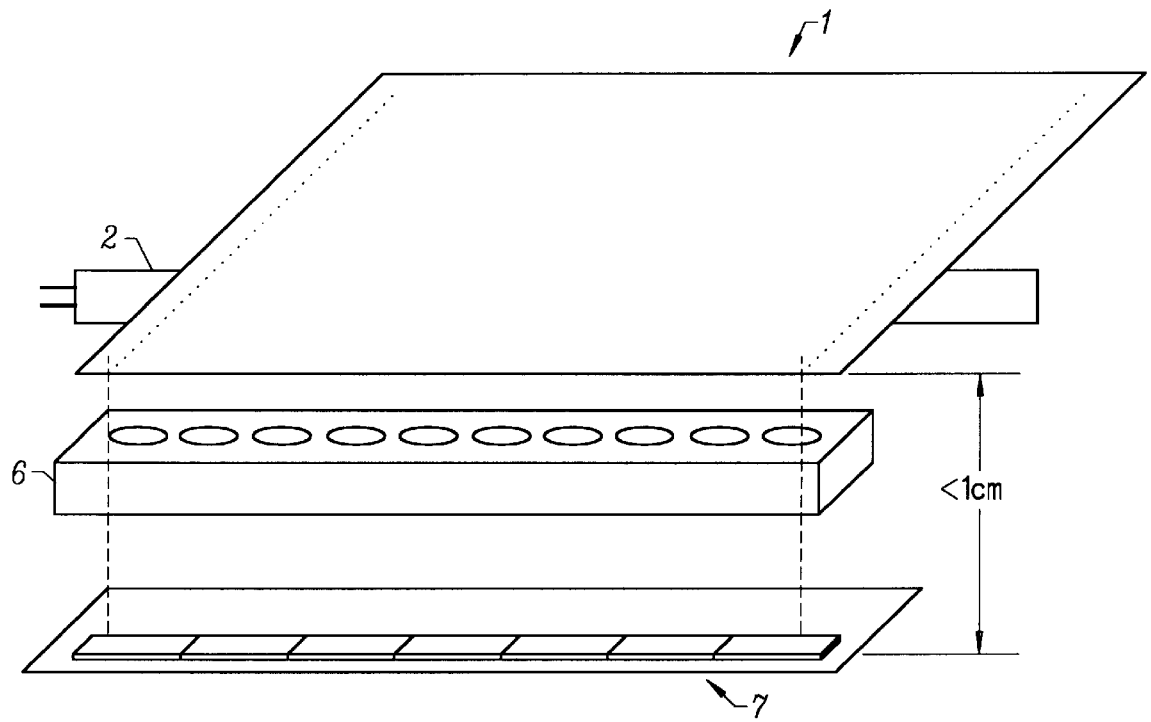
FIG. 3 is a schematic view of a prior art Contact type Image Sensor (CIS) system.
Figure 4:
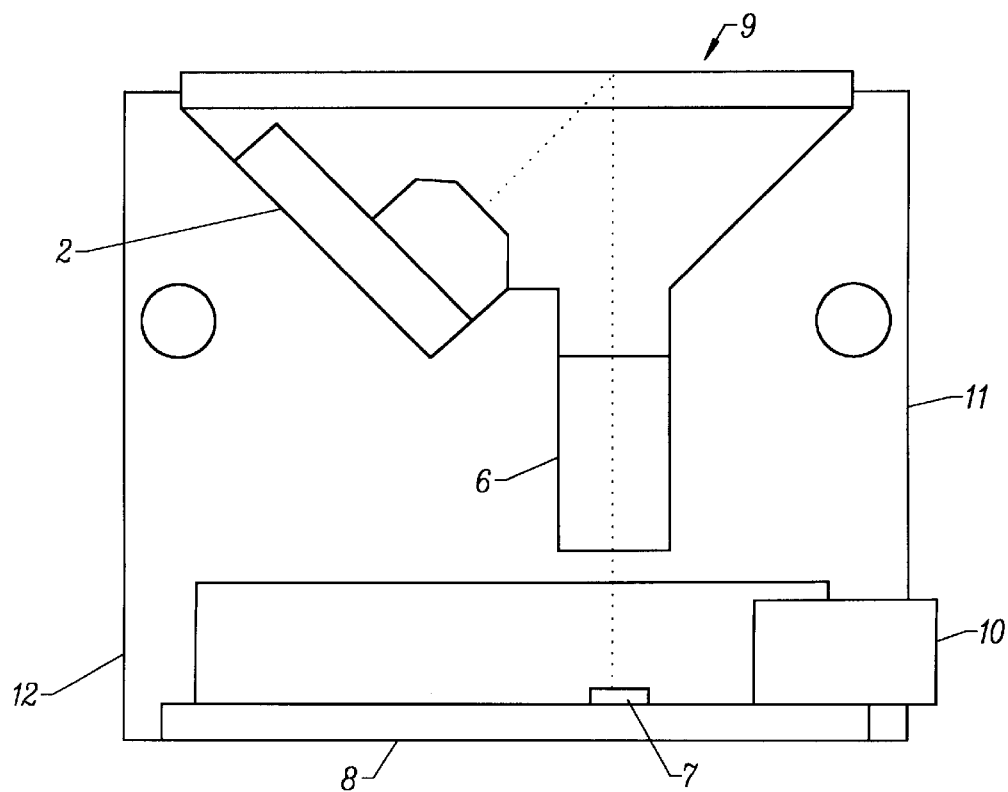
FIG. 4 is a cross section view of a prior art Contact Image Sensor (CIS) module.
Figure 5:
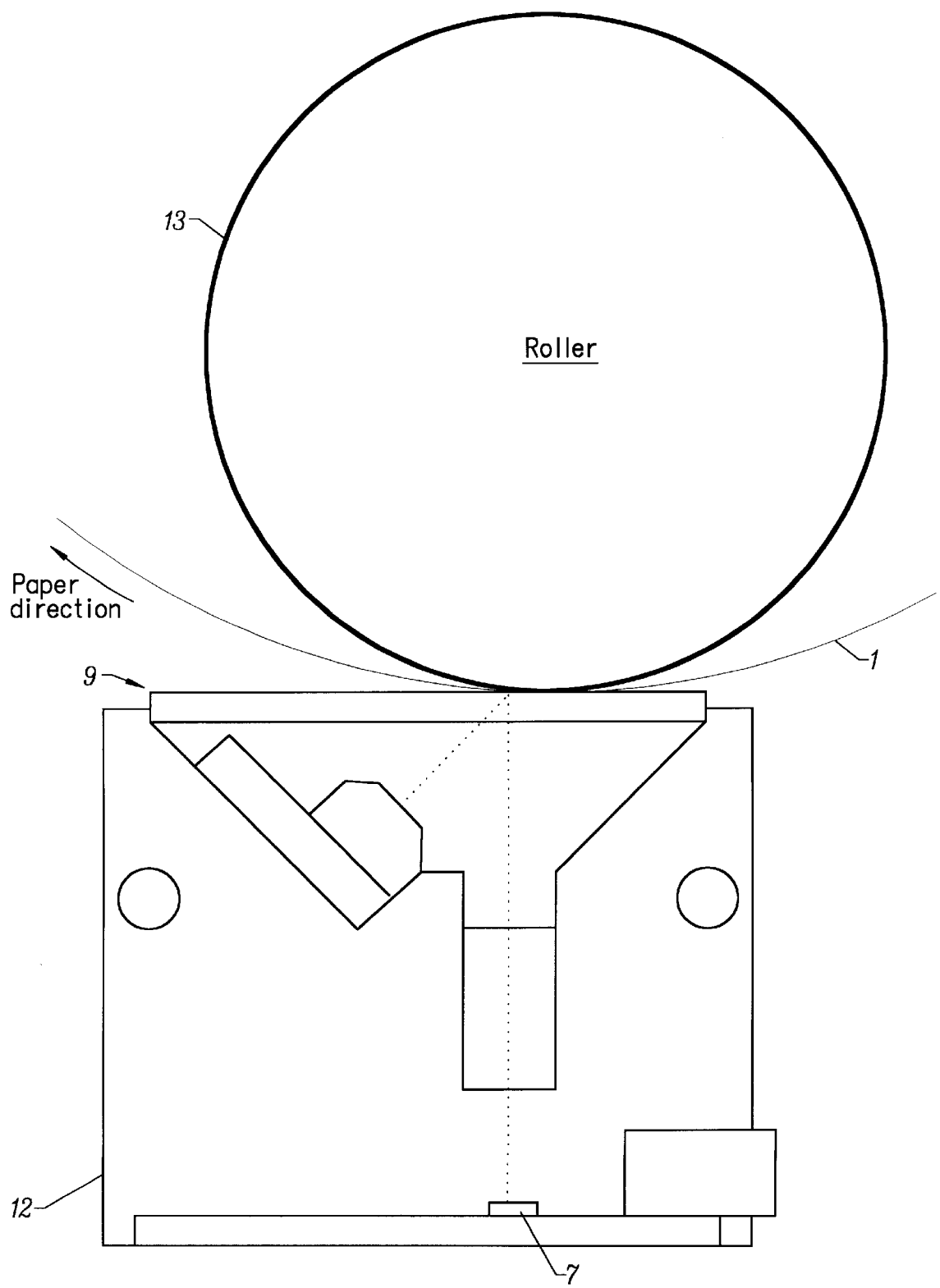
FIG. 5 is a cross section view of a prior art paper feeder scanning system incorporating a CIS module.
Figure 6A:
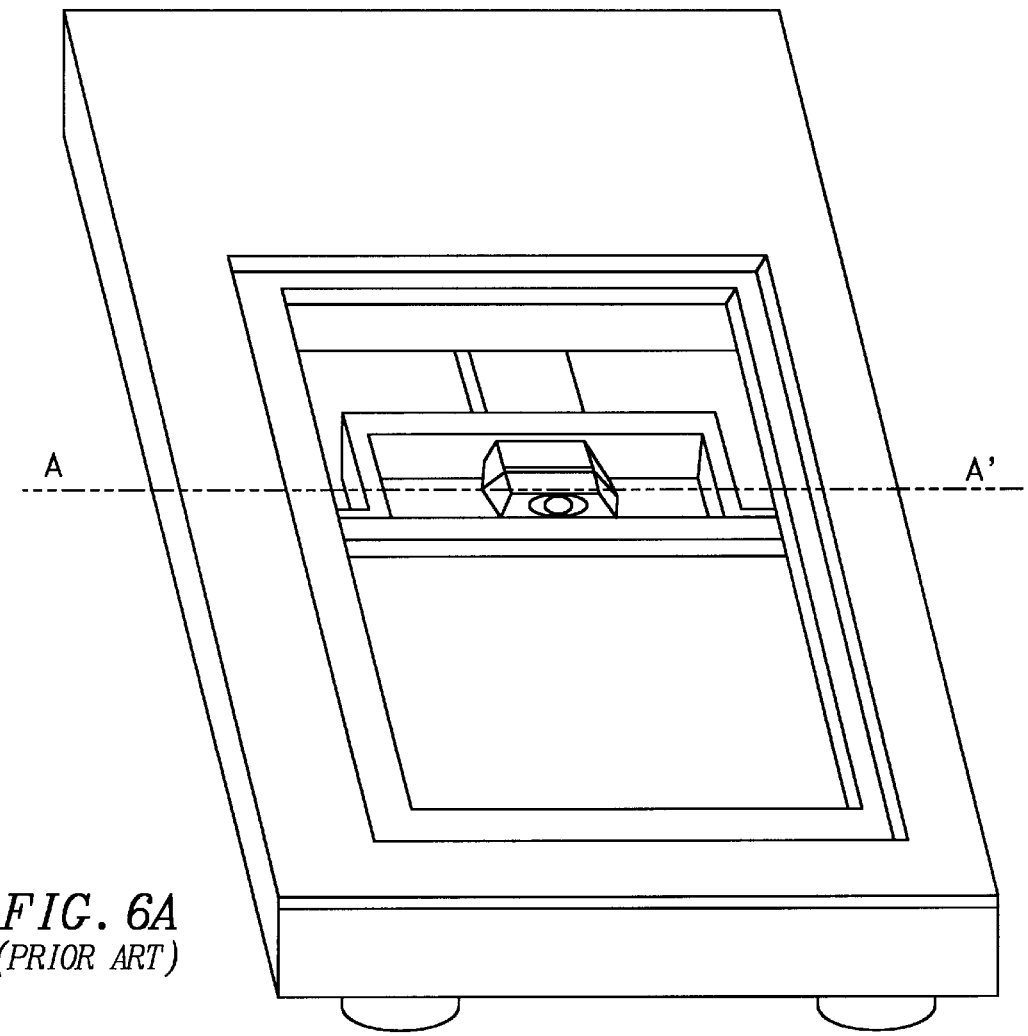
FIG. 6a is a pictorial view of a prior art flatbed scanner.
Figure 6B:
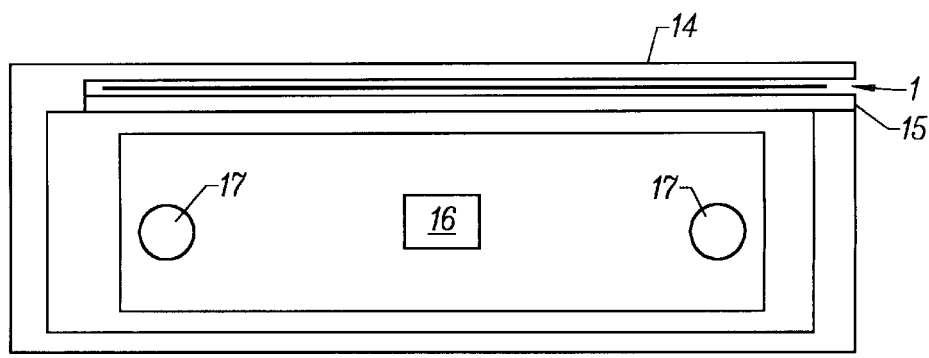
FIG. 6b is a cross section view of a prior art flatbed scanner incorporating a CCD module.
Figure 7:
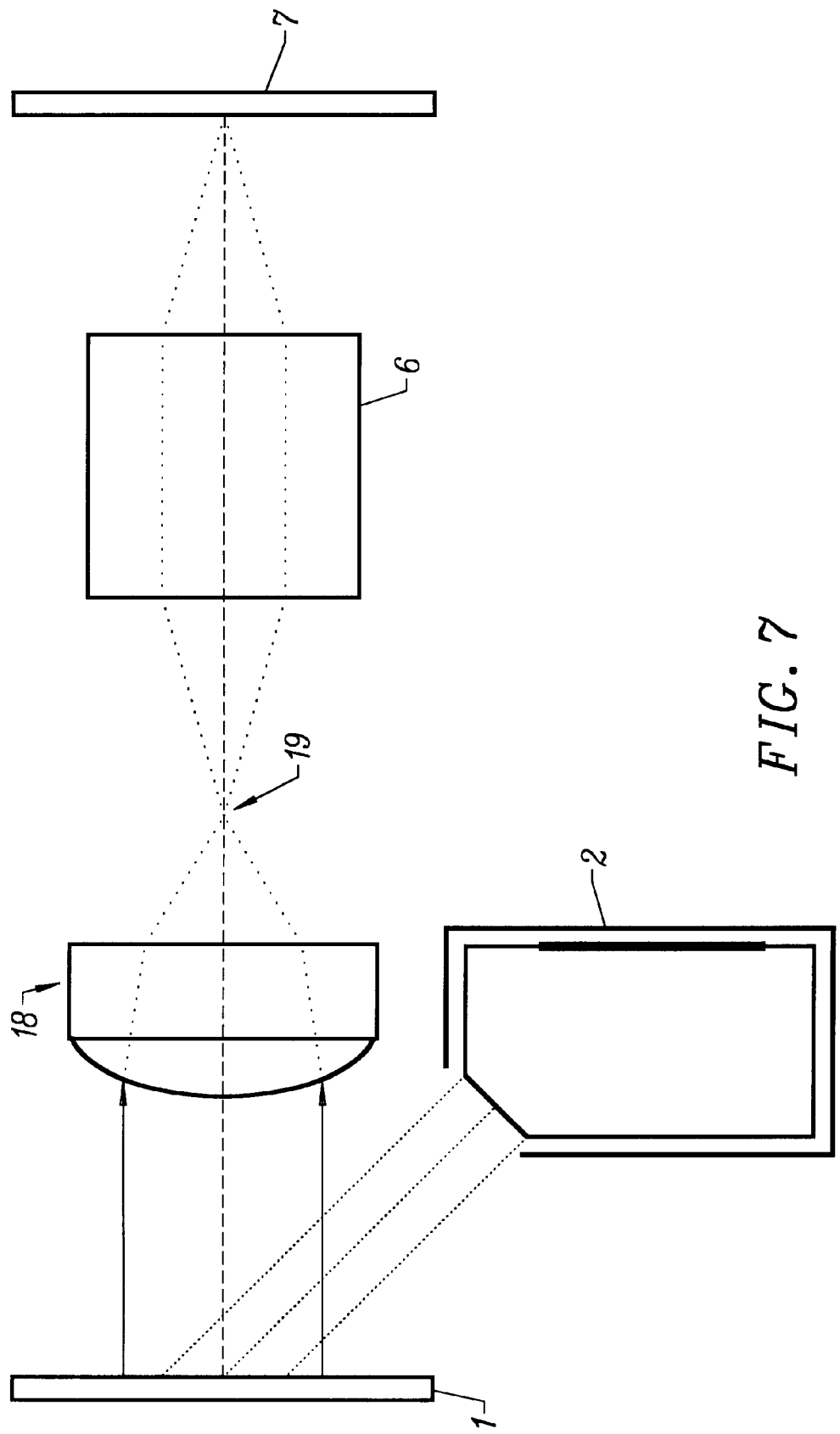
FIG. 7 is a schematic diagram of the Long depth of Focus Contact type Image Sensor (Lf-cis) system according to the invention.
Figure 8A:
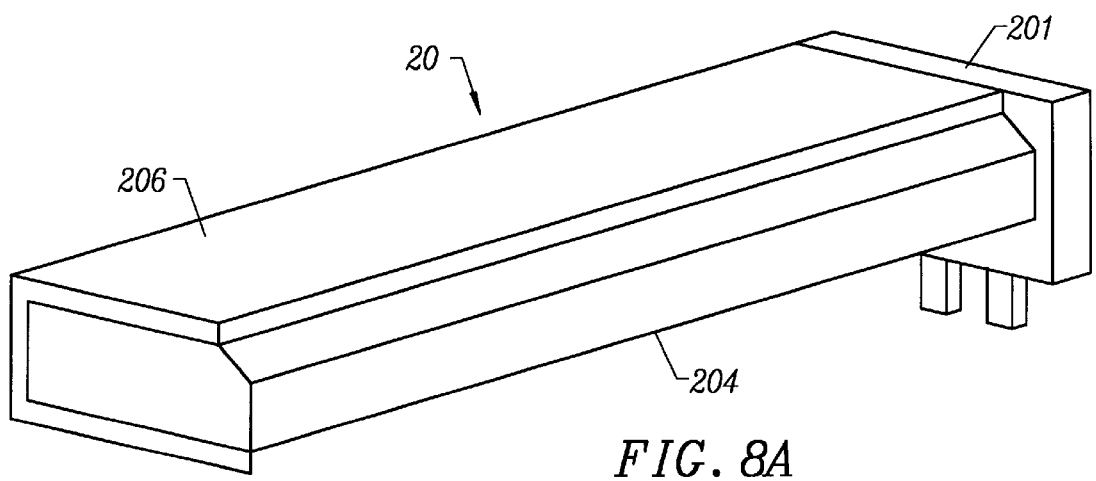
FIG. 8a is a pictorial view of the LED light pipe according to the invention.
Figure 8B:
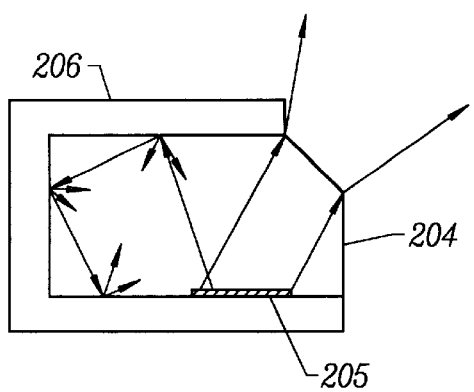
FIG. 8b is a cross section view of the light pipe of FIG. 8a in which an LED light is guided by a reflected metal and an opaque envelope to emit light in a particular direction according to the invention.
Figure 8C:
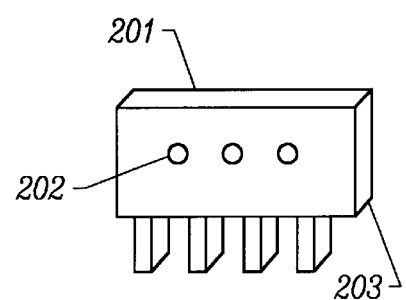
FIG. 8c is a pictorial view of the LED assembly of FIG. 8a according to the invention.
Figure 8D:
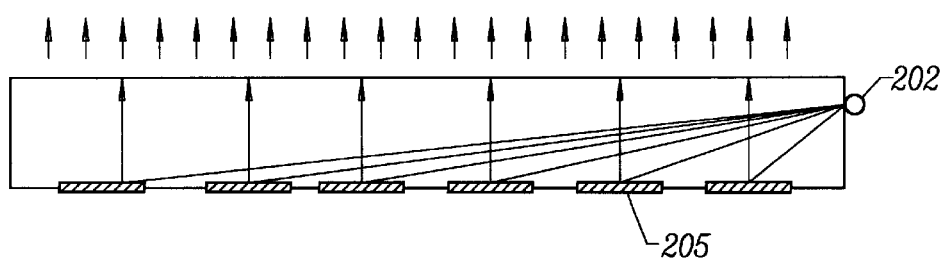
FIG. 8d is a light trace of the LED light pipe that indicates the light is converted from the point source to a line source according to the invention.

The invention provides a Long depth of Focus Contact type Image Sensor (Lf-cis) system using a plano-cylindrical lens and an SLA to increase the depth of focus on the document image. FIG. 7 is a simplified block diagram of the Lf-cis system. The system requires four essential elements to capture the image of a subject document. They are (1) a LED light source 2 to illuminate the document 1, (2) a plano-cylindrical lens 18 to focus the reflected document image to the object plane 19 of the SLA 6, (3) a one-to-one SLA "6 to transfer the image from the object plane 19 to the image sensor array 7, and (4) a full width image sensor array 7 to convert the reflected document 1 image to an electronic signal.

In the invention, the LED light source 2 can be made using either an LED light bar or an LED light pipe. An LED light bar comprises a printed circuit board that is assembled with a plurality of LED chips and a plurality of current limited resistances. A diffuser is mounted on the top of the LED chips to diffuse light from several strong points to a more even and uniform light. To achieve a uniform light distribution across a whole page width of document, LED chips having equal light intensity must be selected for each LED light bar.

Because the light intensity of each LED IC varies from one to three times, even on one single wafer, it is difficult to produce a uniform light bar. The LED light pipe was developed to solve the above problem. FIGS. 8a–8d show a schematic diagram of an LED light pipe 20. The LED light pipe consists of (1) LED assembly 201 comprising several LED chips 202 (FIG. 8c) mounted on a substrate 203 (lead frame or PCB) to emit the light, (2) an acrylic light pipe 204 with a metal reflector 205 for transmitting the LED light from a point source to a line source, (3) an envelope 206 to house the acrylic light pipes 204 and to guide the light emitted to one direction.

The uniformity of the light is controlled by the metal reflector 205 pattern instead of the LED IC 202. In this way, a uniform light can be produced by the LED light pipe 20. The efficiency of the light is higher using an LED light pipe 20. Only a few LED chips are required on for a black and white (B/W) CIS module. For a color LED light pipe 20, one chip per color (R, G, B) is sufficient to provide adequate light intensity for a color CIS module. The power consumption of the LED light pipe 20 is low. Therefore, several new applications are provided that require low power consumption, for example notebook scanners or portable scanners.

Figure 9A:
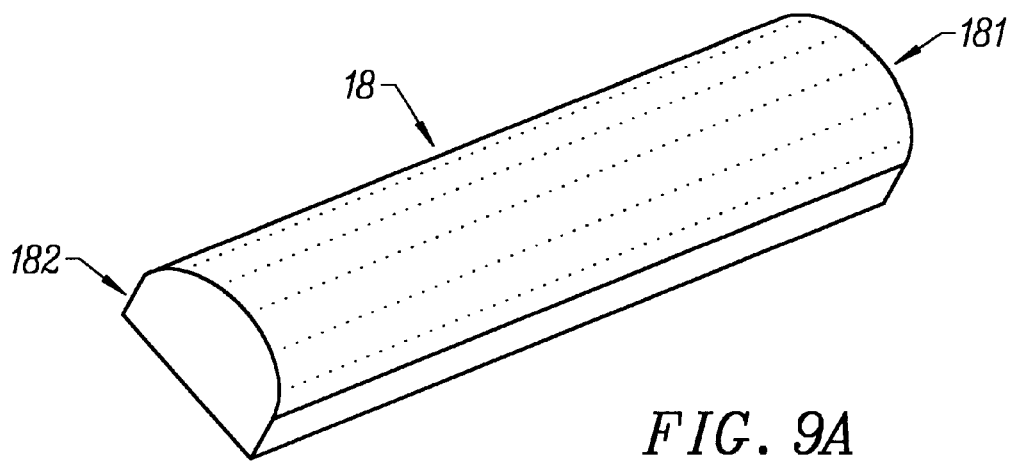
FIG. 9a is a pictorial view of a long page width plano-cylindrical lens according to the invention.
Figure 9B:
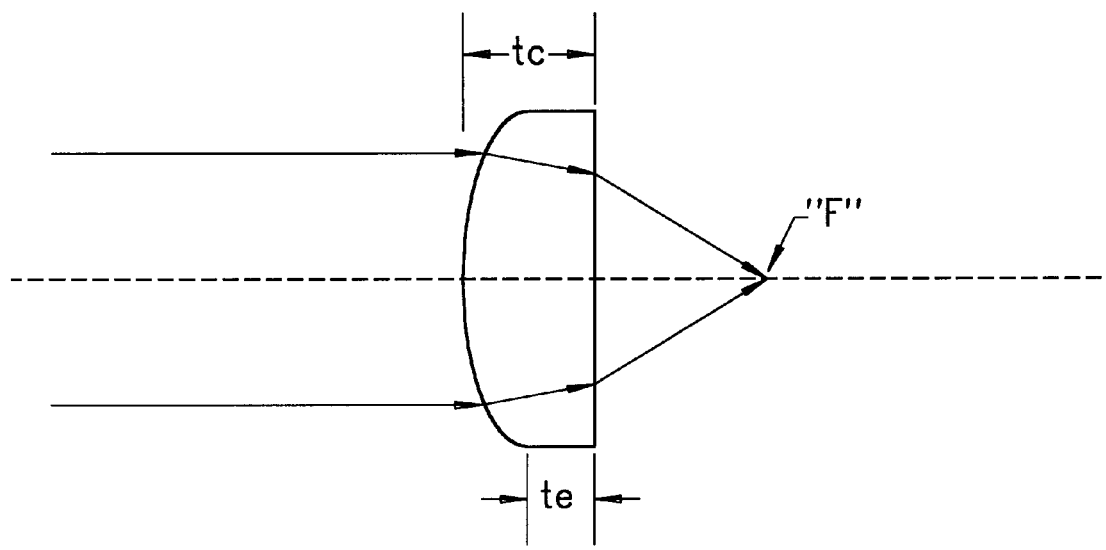
FIG. 9b is an optical ray trace of the plano-cylindrical lens of FIG. 9a according to the invention.

FIG. 9a shows the outline drawing of the plano-cylindrical lens 18. The ray trace of the plano-cylindrical lens is shown in FIG. 9b. One line of the document image is focused on the position "F" (perpendicular to the paper). This focus point is situated on the object plane of the SLA. The invention uses a plano-cylindrical lens having a one-to-one ratio (no magnification) on the vertical direction (paper width direction), and a reduction on the horizontal direction (paper length direction). Because the length of the image sensor is the same length as the plano-cylindrical lens in the vertical direction, the optical distance of the lens can be kept very short.

The pixel sizes of the image sensor in the horizontal direction must match the reduction ratio of the lens. If the reduction rate of the plano-cylindrical lens is equal to two, then each pixel size can be reduced by a factor of two. In the exemplary embodiment of the invention, the pixel size is reduced from 84.5 micrometers×84.5 micrometers to 42.25 micrometers×84.5 micrometers for 300 dpi resolution.

A plano-cylindrical lens 18 is divided into two portions. One portion is a curvature body 181, the other portion is a flat, rectangular body 182 having a thickness of te. The total thickness of the plano-cylindrical lens 18 is tc. Because the pixel size is very small, the lens length is very long. The physical shape of the plano-cylindrical lens 18 is very thin and long. It is very difficult to handle such a lens in the module assembly. To solve this problem, the rectangular body is preferably extended on its width and keep the curvature body 181 the same size.

Figure 10A:
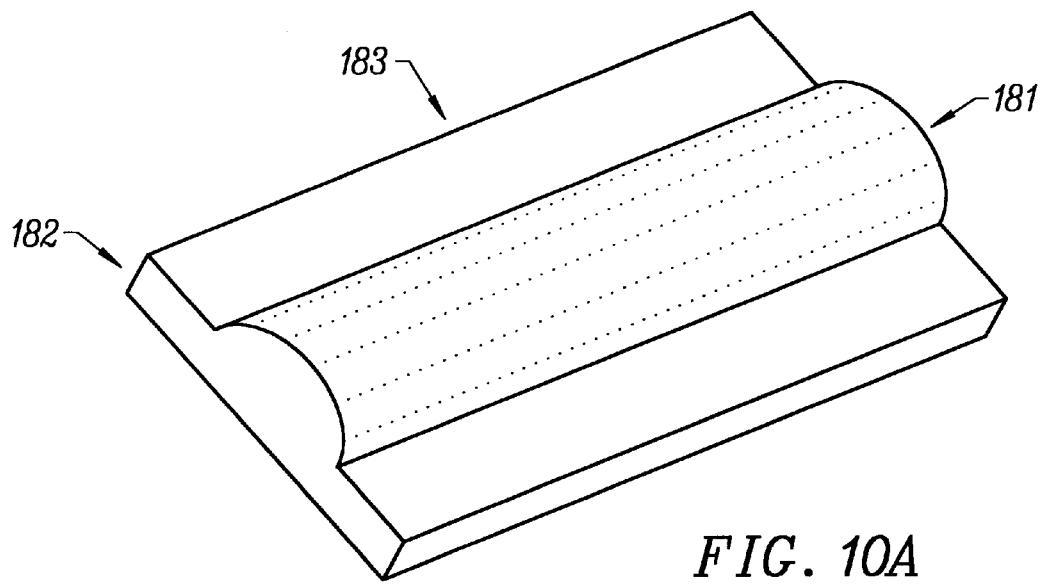
FIG. 10a is a pictorial view of the modified plano-cylindrical lens having a wide rectangular body according to the invention.
Figure 10B:
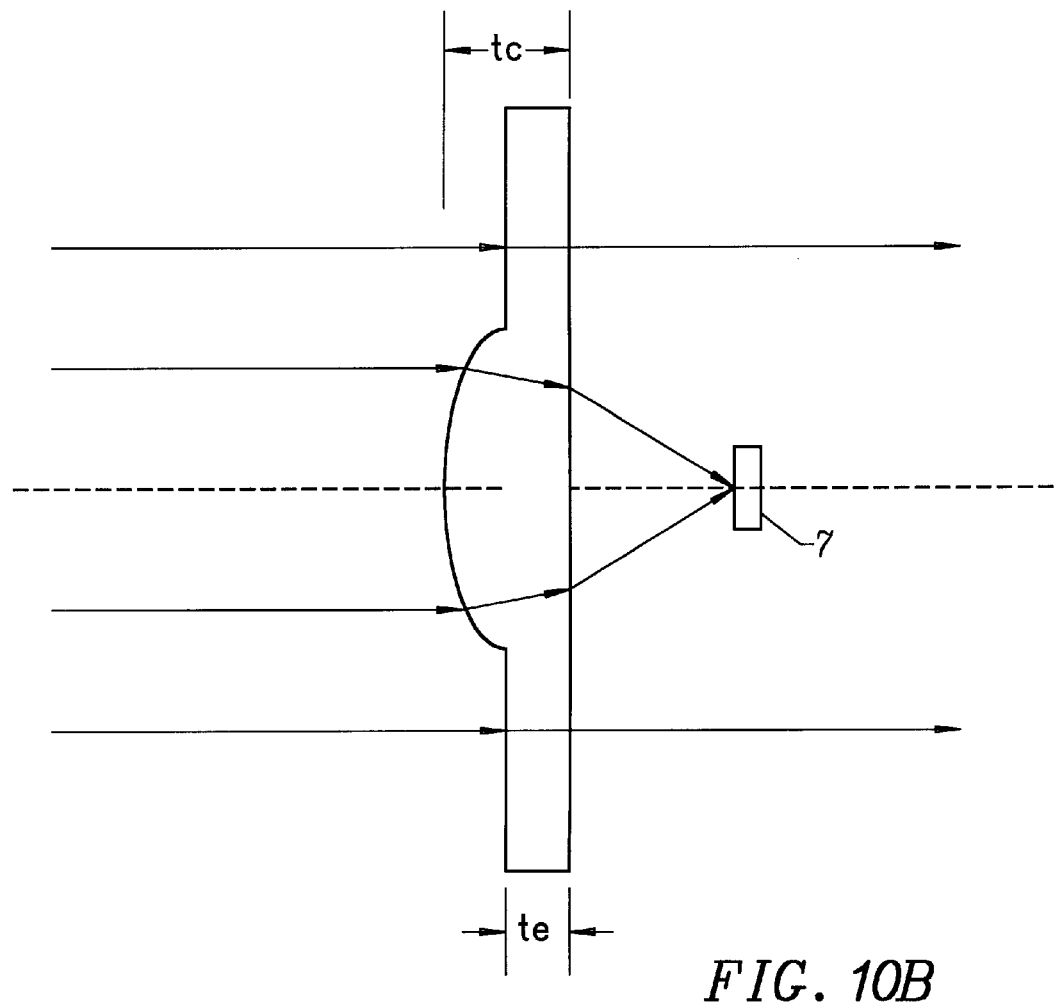
FIG. 10b is an optical ray trace of the modified plano-cylindrical lens of FIG. 10a according to the invention.

FIG. 10a shows a modified plano-cylindrical lens 183 having a wider rectangular body 184 and the same size of curvature body 181. The ray trace of the modified plano-cylindrical lens is shown in FIG. 10b. Because the area of each pixel of the image sensor IC is 42.25 micrometers×84.5 micrometers, the lens automatically discards all of the optical image outside the pixel area. Only one line of the document image can be detected on the image sensor array.

One of the advantage of the modified plano-cylindrical lens 183 is that it is easy to handle in during module assembly because of its big size. Another advantage of the lens is that it can be used to shield the CIS module and prevent dust from going into the SLA and image sensor array. By increasing the thickness of rectangular body te and the reduction ratio of the curvature body, the focal point of the plano-cylindrical lens can be placed either outside the lens, on the lens, or inside the lens.

Figure 11A:
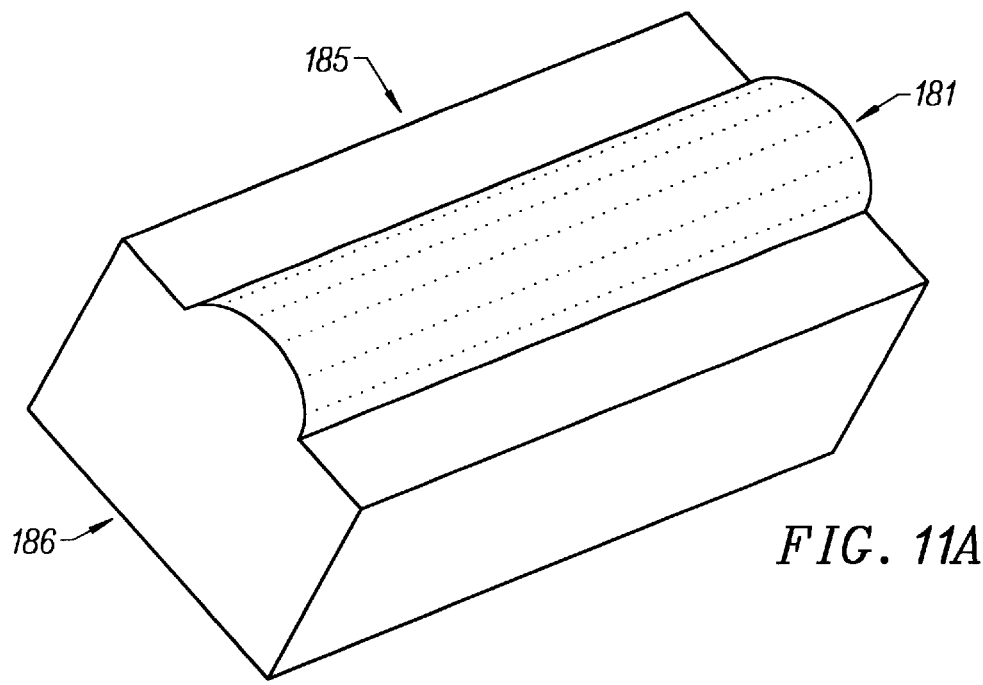
FIG. 11a is a pictorial view of a plano-cylindrical lens having a thick rectangular body according to the invention.
Figure 11B:
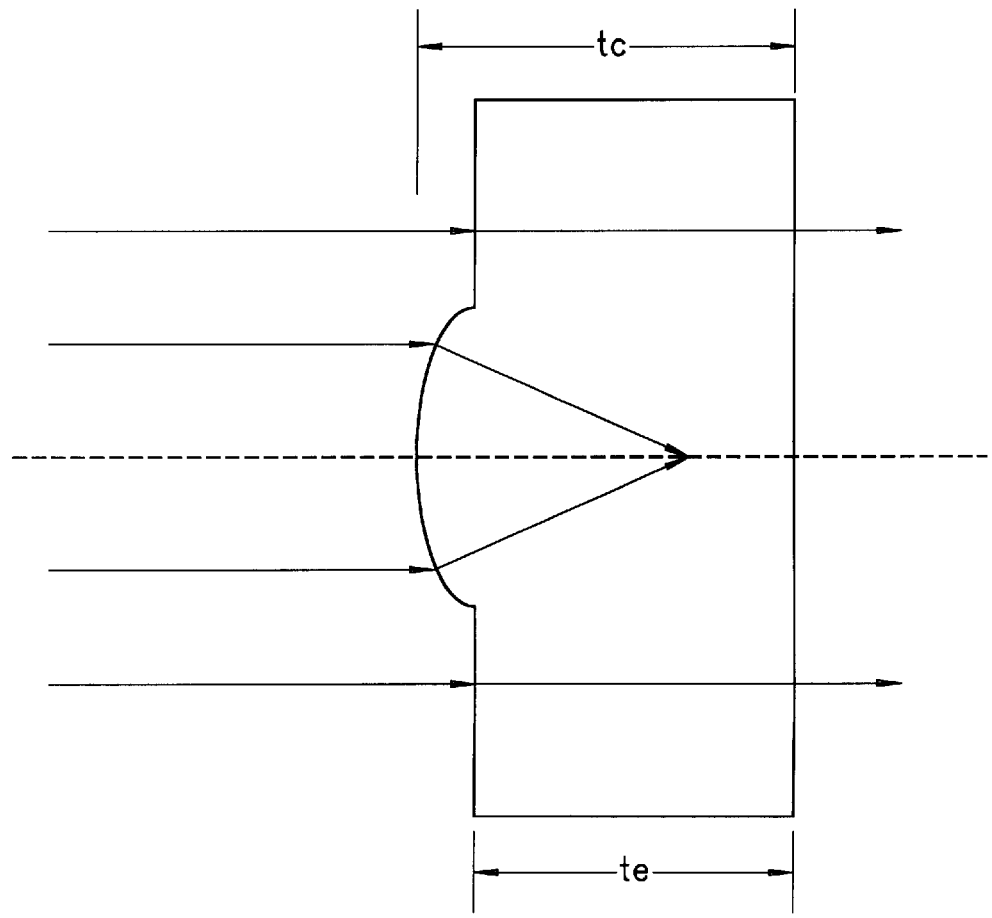
FIG. 11b is an optical ray trace of the modified plano-cylindrical lens of FIG. 11a according to the invention.

FIG. 11a shows a pictorial view of the plano-cylindrical lens 185 having a focal point inside the lens. The ray trace of the modified plano-cylindrical lens is shown in FIG. 11b. The thickness of the rectangular body 186 is longer than the focal point of the curvature body. Such lens can be used to correct the chromatic aberration of the SLA in a color Lf-cis module.

Figure 12A:
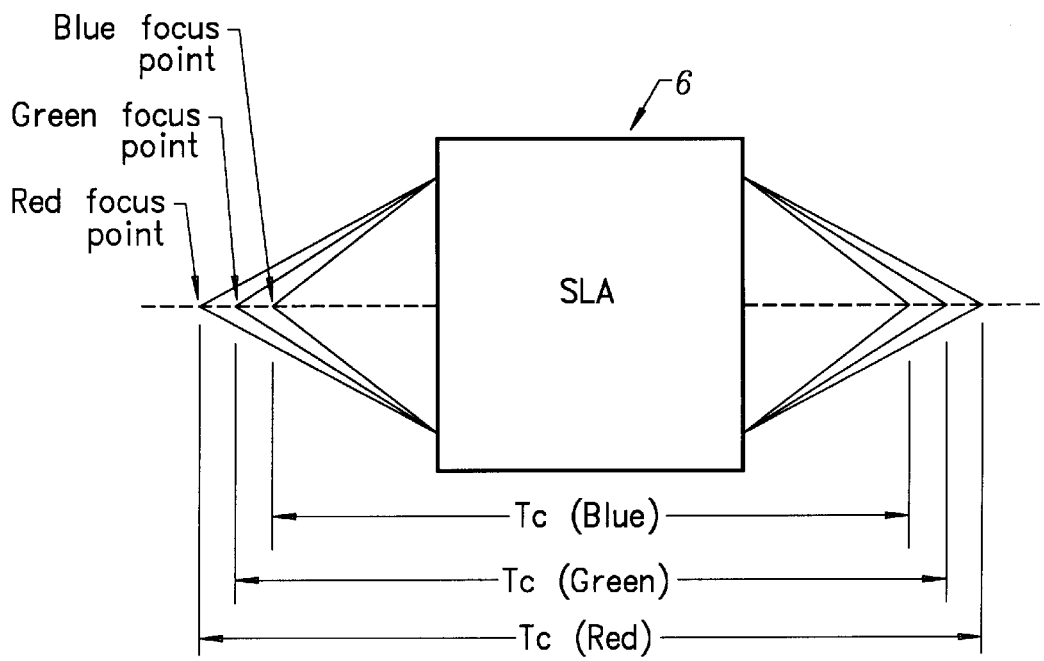
FIG. 12a is a simplified optical path of the SLA for different colors (wavelength) of light, where the total conjugate (To) of three primary colors (R, G, B) is different according to the invention.

A Selfoc graded-index lens 6 has a chromatic aberration that is caused by dispersion of the refractive index on the optical axis and the quadratic gradient constant. As shown in FIG. 12a, the refractive index profile changes with changes in wavelength, so that each wavelength has a different pitch length. Chromatic aberration varies in different types of SLA due to changes in ion exchange materials. The total conjugate (Tc) (a distance of the object plane to image plane) of the SLA has different values for each wavelength due to this chromatic aberration. The total conjugate variation with wavelength is large for the current SLA used in CIS modules.

Figure 12B:
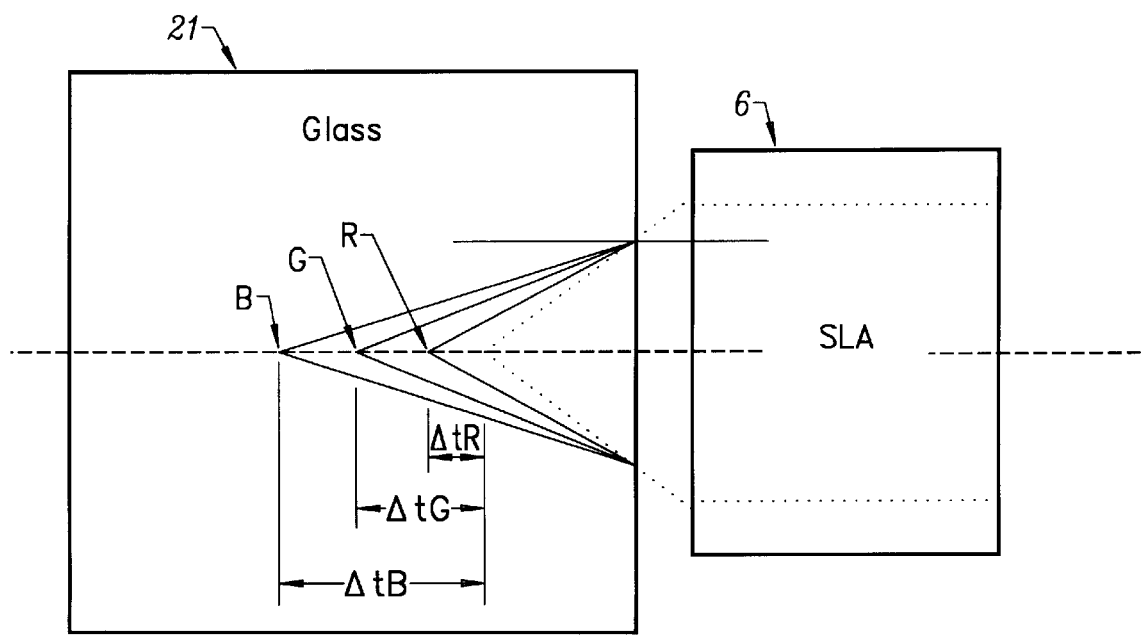
FIG. 12b is a ray trace of the displacement in focal point caused by a glass plate for different colors of light according to the invention.

When designed for the SLA, the displacement in focal point (shown in FIG. 12b) caused by a glass plate 21 can be adjusted by:

$$\Delta t = [(n-1)/n]*t \quad (1)$$

where:

$\Delta t$ is the displacement of object;

t is the glass thickness; and n is the refractive index of glass plate.

The index of refraction of a material is a function of wavelength. The light rays of different wavelengths or colors are refracted at different angles based on the equation of Snell's law. The displacement of an object of ($\Delta t_R$, $\Delta t_G$, $\Delta t_B$) for each color (R, G, B) is as follows:

$$\Delta t_R = [(n_R-1)/n_R]*t \quad (2)$$

$$\Delta t_G = [(n_G-1)/n_G]*t \quad (3)$$

$$\Delta t_B = [(n_B-1)/n_B]*t \quad (4)$$

where:

$n_R$, $n_G$, $n_B$ is the refractive index of glass plate 21 for R, G, B, respectively.

The displacement of blue color is greater than red and green because the refractive index of blue is higher than that of other colors (R, G).

Figure 13:
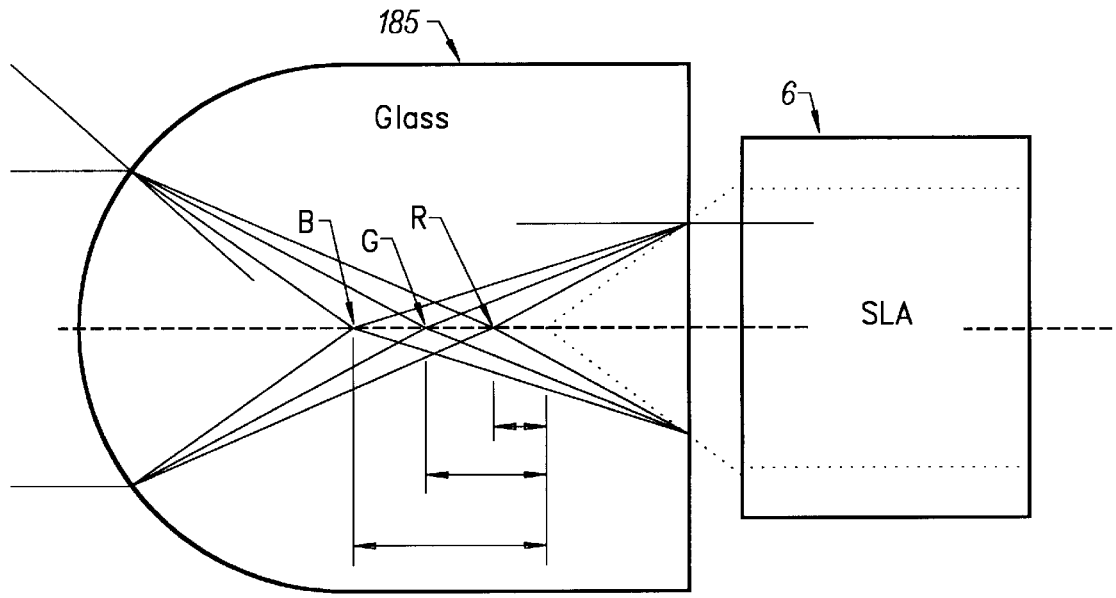
FIG. 13 is a simplified optical path of three primary colors (R, G, B) achieved by adding a plano-cylindrical lens to the SLA, where the chromatic aberration of the SLA is corrected by moved the focus point inside the plano-cylindrical lens according to the invention.

FIG. 13 shows the ray trace diagram where a plano-cylindrical lens is added on the left hand side of the SLA. For the light from the document, the plano-cylindrical lens has a curvature shape, whereas the lens has a flat shape for light from the SLA array. Because the index of refraction is higher for shorter wavelengths (B), light at these shorter wavelengths is focused closer to the curvature than light at longer wavelengths (R) when the light is incident from the document. This is opposite for light from the SLA. Because the lens has a flat shape, short wavelength light (B) is focused farther from the flat portion than is longer wavelength light (R). By combining both plano-cylindrical lens and SLA, the ray trace from the document and the ray trace from the SLA have opposite signs of chromatic aberration. Therefore, by providing an optimum design for the rectangular body 186 of the plano-cylindrical lens "185", it is possible to partially or completely correct chromatic aberration.

The image sensor array uses a single full width, hybrid, butted image sensor array. A plurality of image sensor ICs are butted end-by-end on one ceramic substrate, printed circuit board, or epoxy substrate. This arrangement takes advantage of the simplicity of CMOS technology and the high speed, high dynamic range, and high sensitivity providing by parallel transfer and correlated double sampling (CDS) or other advanced signal processing techniques. One line of the sensor array is suitable for both B/W and color applications. This arrangement is different from the three lines of the sensor required by conventional CCD arrays.

For a color Lf-cis module, a color light pipe having three primary colors (R, G, B) of LEDs is used to illuminate the document. First, the document is illuminated by a first primary color of LED and read out of that first primary color of image signal is performed by one line of image sensor array. Second, the document is illuminated by a second primary color of LED and read out of that second primary of color image is performed by one line of image sensor array. Third, the document is then illuminated by a third primary color of LED and read out that third primary of color image is performed by one line of the image sensor array.

Each pixel of color image is reconstructed by combining the three primary color image signals for that pixel. The sensor elements can be made using either Passive Pixel Sensors (PPS) or Active Pixel Sensors (APS). Two passive pixel sensors are commonly used in this case: one sensor is a phototransistor, the other sensor is a photodiode.

In a phototransistor structure, the photo-charge is generated from incident light and stored on the base of the phototransistor. The phototransistor has internal gain to increase the base signal, such that the output signal is larger. Because the phototransistor gain is not equal for all of the signal, the linearity of the photo-response is not equal to one. In addition, the phototransistor is turned off when the base-to-emitter voltage less than 0.7 V, thus causing a low light level threshold problem. Both nonlinearity and low light level threshold problems cause a serious problem when a phototransistor is used to scan a color document because each pixel of the color image is combined as three primary colors, each having a different percentage.

For color image scanning, one or two colors of three primary colors are typically in a low light condition. The detected signal of that low light level color is therefore distorted. After color reconstruction, the combined color is also distorted. The photodiode structure is used to solve this problem. A photodiode has better linearity characteristics, low light level sensitivity, and fast speed than that of a phototransistor. The photo-charge is generated from the incident light and stored on the photodiode. This photo-charge is then read out by signal processing.

Because the output node capacity of a photodiode is large, the output voltage is small, and the noise is high. An active pixel sensor (APS) photodetector is used to solve the problems of small signal and high noise of the photodiode structure. A detected charge on each pixel is converted to voltage. The detected voltage level is proportional to the reflected light, as opposed to charge generated in detected elements. These stored voltage signals may then be processed to reduce noise and offset by means, such as correlated double sampling (CDS) or differential voltage pickoff. Another advantage of the active pixel sensor is that the sensitivity of the sensing element is independent of detector size. As a result, a very high density sensor IC having very high sensitivity and with noise reduction processing can be realized.

Figure 14:
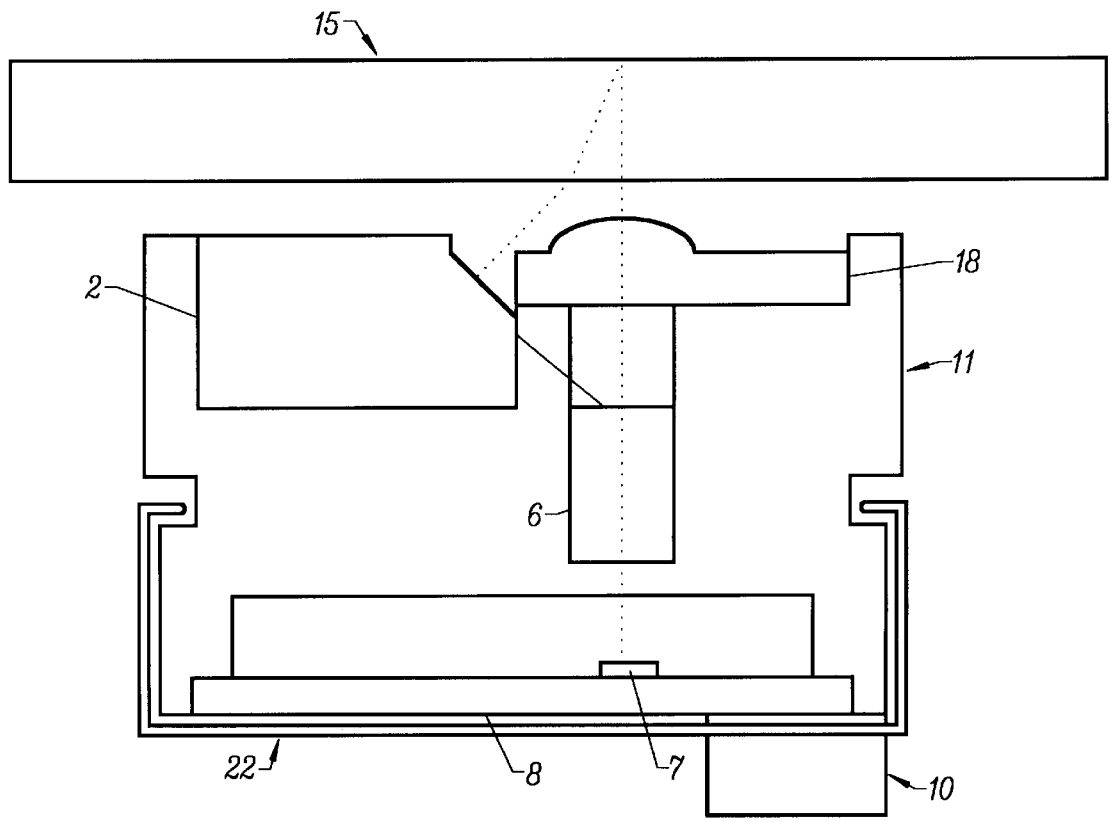
FIG. 14 is a cross section view of a Long depth of Focus Contact Image Sensor (Lf-cis) module according to the invention.

The Lf-cis system can be assembled as a compact module. FIG. 14 shows a cross section view of the Lf-cis module. The module consists of (1) a LED light source 2 to illuminate the document 1, (2) a plano-cylindrical lens array 18 to focus the document image to the object plane of the SLA 6, (3) an SLA 6 array to transfer the object plane signal to the image sensor array 7, (4) a full width, butted image sensor array board 8 having a plurality of image sensor arrays 7 to convert the optical signal to an electronic signal, (5) a connector 10 to link an electronic signal to outside circuitry, (6) a case 11 to house all of the above components, and (7) a stainless steel bracket 22 to hold the module and maintain the optical path in alignment.

Two ends of the Lf-cis module are higher than the rest of the module (see FIGS. 15*a* and 15*b*). The module can be made as a part of the case (FIG. 15*a*) or as a separated end cap (see FIG. 15*b*) with a Teflon® coating.

Figure 16A:
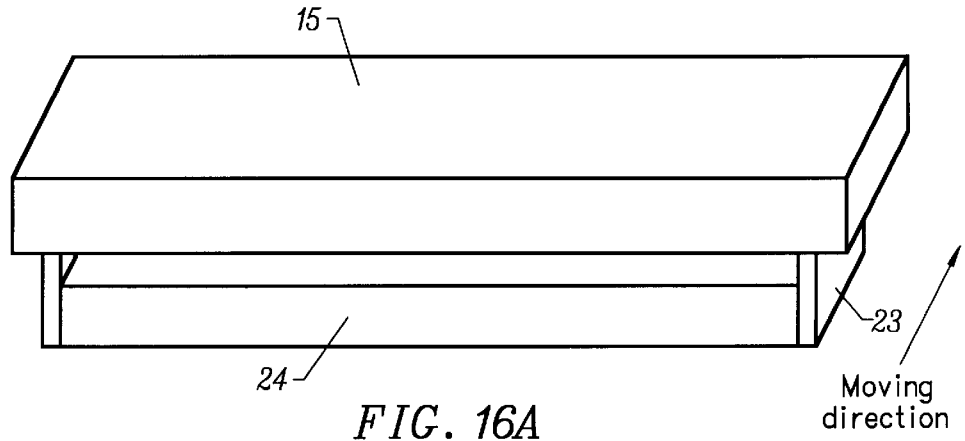
FIG. 16a is a front side view showing the Lf-cis module self-aligned to the bottom of the glass by having two ends of the module higher than the rest of the module according to the invention.
Figure 16B:
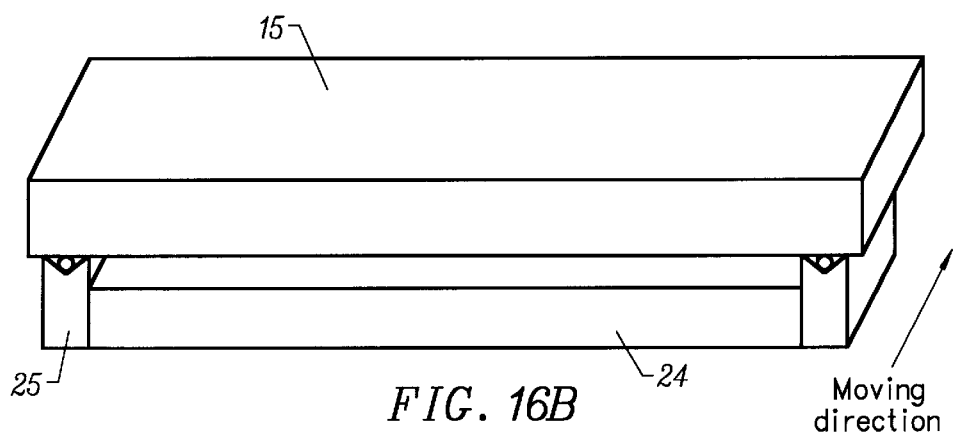
FIG. 16b is a front side view showing the Lf-cis module self-aligned to the bottom of the glass by a rolling guide according to the invention.
Figure 16C:
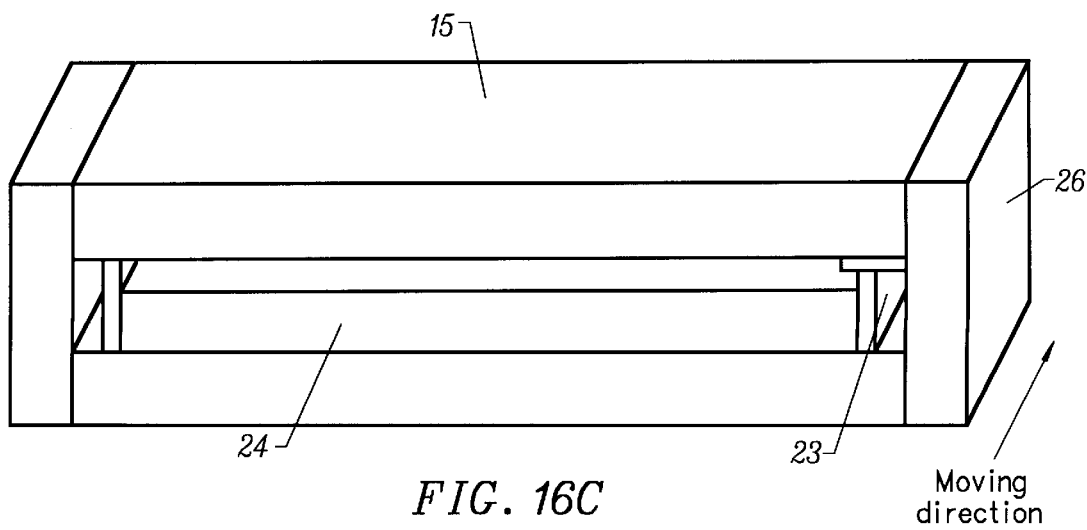
FIG. 16c is a front side view showing the Lf-cis module self-aligned to the scanner metal case according to the invention.

There are several methods to maintain the same optical distance during scanning. FIG. 16*a* shows the Lf-cis module 24 in direct contact with the bottom of the scanner glass 15 at two ends 23 to reduce the contact area between the glass and the module and to reduce the possibility scratching the glass when the module is moved. FIG. 16*b* is a contact method that uses a rolling guide 25 on both ends of the module in contact with the bottom of the glass 15. Instead of contact to the glass surface, FIG. 16*c* shows that the Lf-cis module is contacted to the metal case 26 of the scanner on both ends 23 of the module. Because the distance between the top the end cap 23 and the rest of the CIS module 24 is constant, a constant optical distance can be kept between the bottom of the glass 15 to the image sensor array 7, even when the stepping motor moves the CIS module forward. In this case, the module maintains the same optical path during scan. Thus, the image sensor module 24 up and down problem found in current CCD modules can be prevented.

Figure 18:
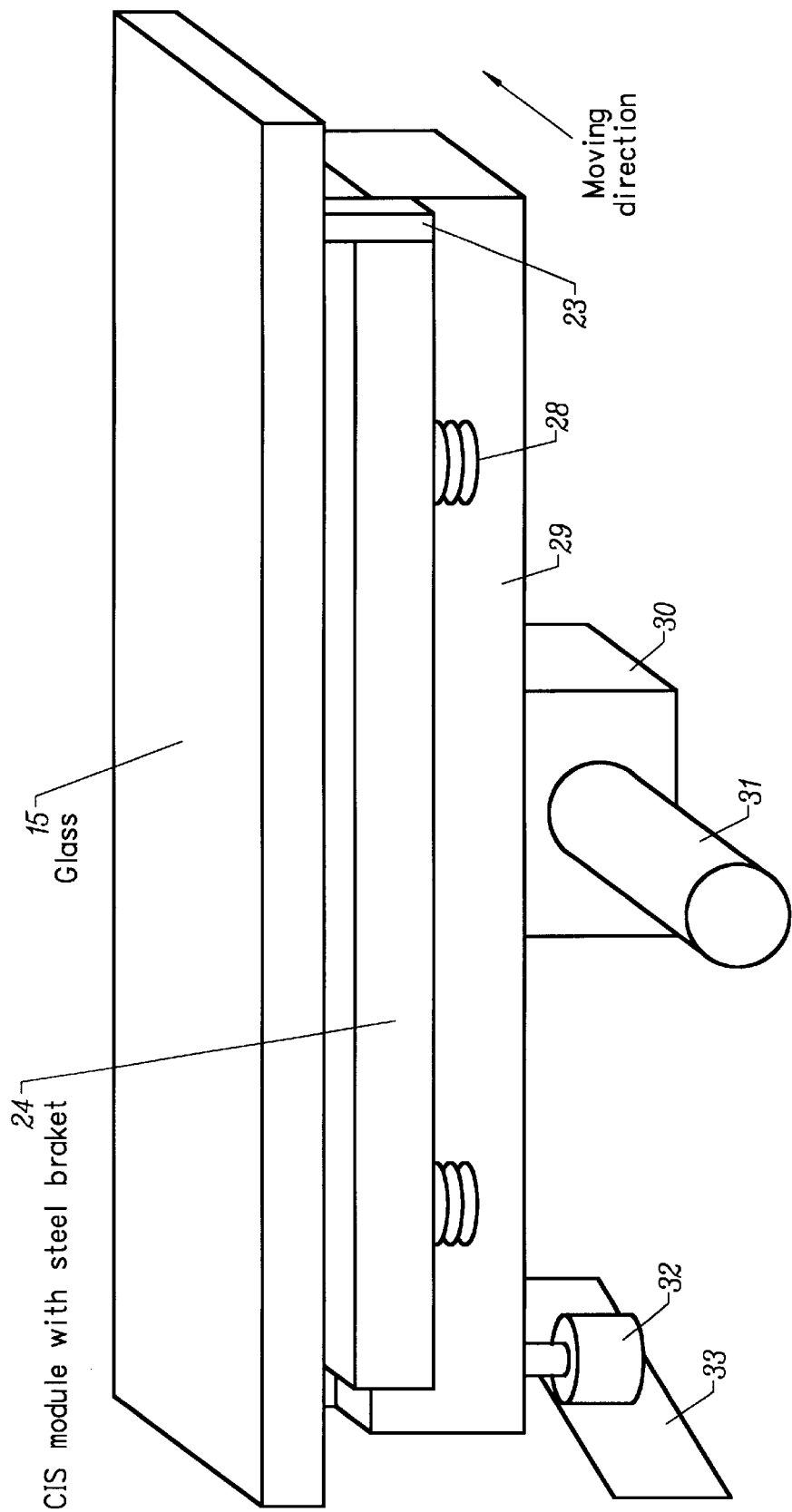
FIG. 18 is a pictorial view of the CIS module mounted on a metal carriage according to the invention.

FIG. 17 shows an outline drawing of steel brackets 27 that are used to hold the module and maintain the optical path in alignment. There are three notches 271 toward the top and two punches 272 toward the bottom of the steel bracket. Three notches 271 are used to push a PCB 8 into alignment and for contact to the bottom of the case of Lf-cis module. This stabilizes the optical path and prevents any modulation transfer function (MTF) problem. Three notches 271 are also used to connect to the ground plane 81 of the PCB 8. The Lf-cis ground plane 81 can be connected to the flatbed scanner ground through, for example, the steel bracket 27, metal spring 28, metal carriage 29, or spherical shaft. This ground plane arrangement is used to prevent an ESD problem in the CIS module. Two punches 272 toward the bottom are used to hold the metal spring 28 in alignment with one side of the spring 28 and to hold to the metal carriage 29 (FIG. 18).

If the object remains fixed, and the detector elements are then moved relative thereto, transverse position control is usually obtained by guide elements at both ends of the detector array. The invention replaces the paired side guide elements with a one or more interior, approximately central guideway(s) which provides several distinctive advantages to be described later. FIG. 18 shows an Lf-cis module 24 that loaded on metal carriage 29. The CIS module 24 is biased by a metal spring 28 and both ends 23 of the CIS module 24 either touch (or are positioned by the rolling guide 25—FIG. 16b) at the bottom of the flatbed scanner's glass 15.

The carriage 29 has a large, round hole 30 formed in the center of the module 24. A spherical, long metal shaft 31 is inserted in this hole 30 and acts as a railway for the CIS module 24. Because this module is compact and light weight, a single railway and a low power stepping motor can be used to drive the entire module. A gear 32 is connected to the bottom of the metal carriage 29. The gear is driven by a gear belt 33.

A stepping motor is used to drive gear belt. A metal carriage loaded with the Lf-cis module is supported by a spherical shaft and the gear belt. The module is contacted to the glass surface, therefore the module is balanced and stable. In operation, the entire CIS module and a metal carriage therefor is moved in the vertical direction (perpendicular to the paper) by the gear and gear belt when stepping motor is turned on.

By adding a cover glass 9 on the top of long DOF-CIS module, the module can be used for paper feeder scanner and handy scanner.

Figure 19:
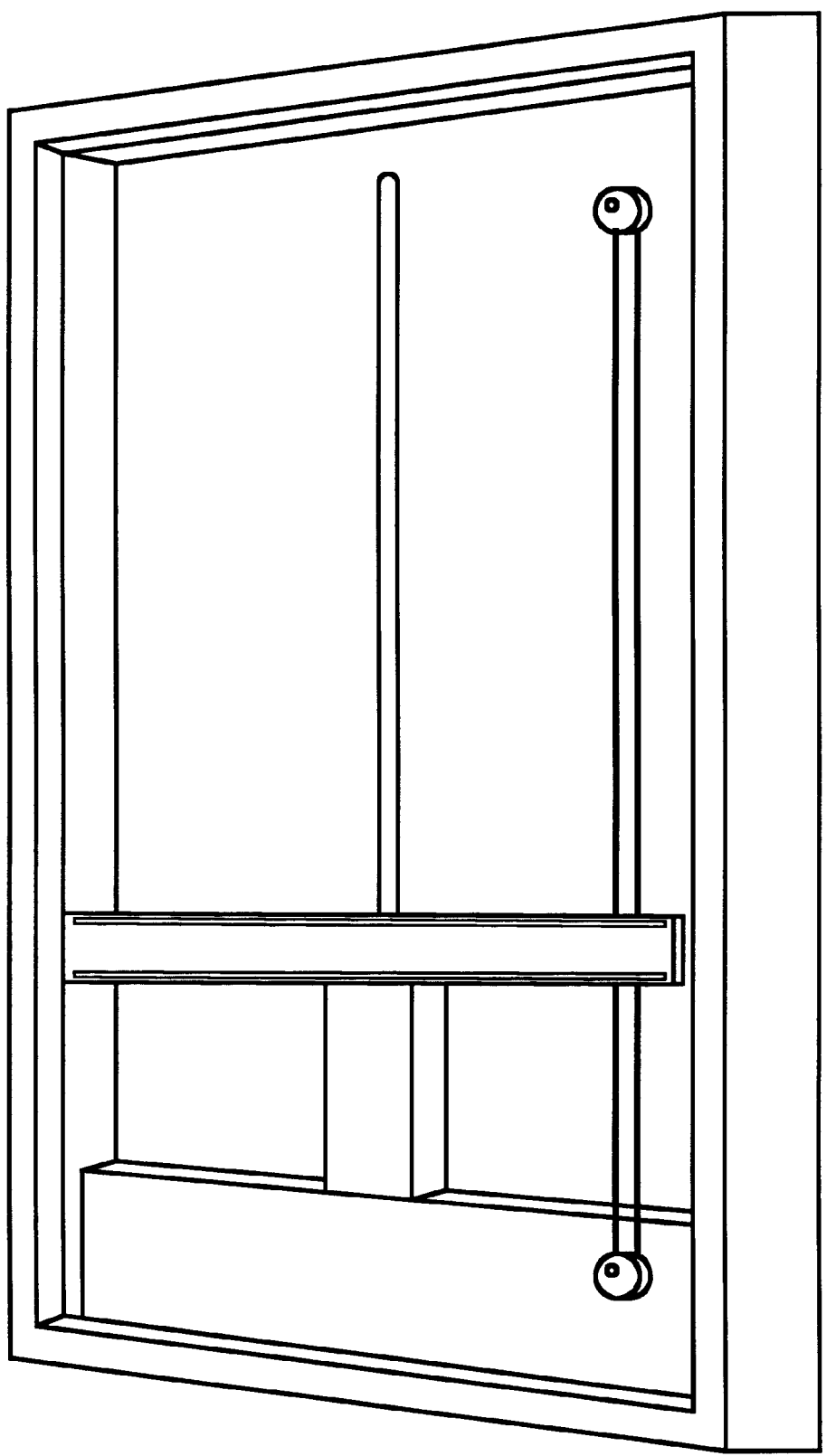
FIG. 19 is a pictorial view of a flatbed scanner incorporating a Lf-cis module according to the invention.
Figure 20:
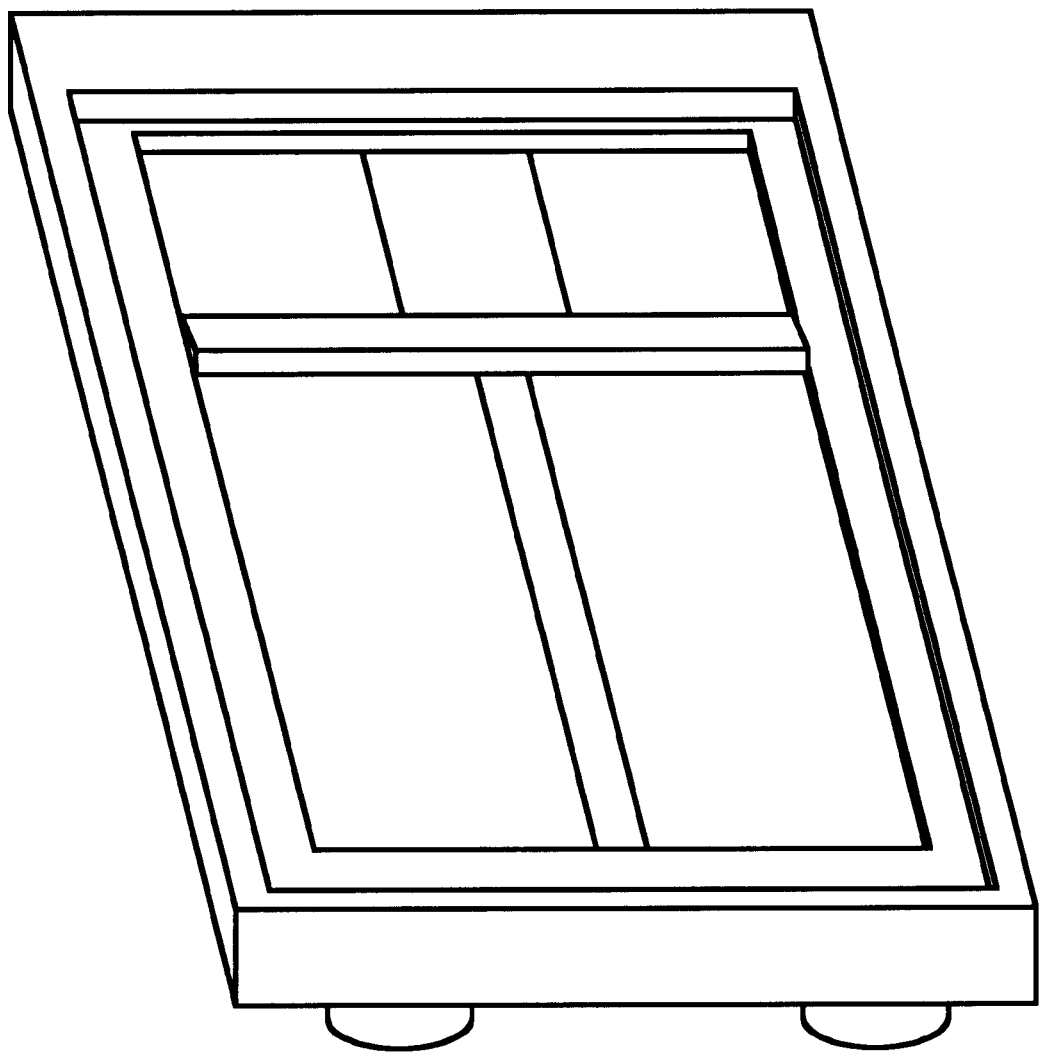
FIG. 20 is an outside view of a compact and light weight flatbed scanner incorporating a Lf-cis module according to the invention.

An outline drawing of the flatbed scanner is shown in FIG. 19 and FIG. 20. A compact size and light weight flatbed type image scanner can be built using the herein described Lf-cis module.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

I claim:

1. A long depth of focus (DOF) contact type image sensor (Lf-cis) system, comprising:
   a light source for illuminating a document;
   an optical lens;
   a one-to-one Selfoc Lens Array (SLA) having an object plane; and
   an image sensor array having an image plane, said image sensor array converting an optical image formed thereon to an electronic signal;
   wherein a reflected document image is focused by said optical lens to said object plane of the said SLA;
   wherein said focused image is then transferred by said SLA to said image plane; and
   wherein said system has a long DOF in a document plane and provides a short optical distance from said document plane to said image plane.

2. The system of claim 1, wherein said light source comprises:
   a single color (wavelength) LED light bar comprising:
      a plurality of LED chips and a plurality of resistance ICs mounted on a printed circuit board; and
      a diffuser lens is mounted on a top of said LED chips to diffuse LED light to a uniform light source;
   wherein a particular color of light is used to illuminate said document, such that only that particular color of light is reflected from said document and background colors are thereby removed from said document; and
   wherein a wavelength of 570 nm may optionally be used for said light source to scan a black and white (B/W) document.

3. The system of claim 1, wherein said light source comprises:
   a single color (wavelength) LED light pipe comprising:
      an LED package that emits a single color of light, said LED package consists of one or more LED chips mounted on a substrate;
      a light pipe having a reflector for transmitting said LED light from a point source to a line source; and
      an envelop for housing said light pipe and for guiding said light emitted therefrom to a particular direction, wherein the uniformity of said emitted light is controlled by a pattern formed on said reflector;
   wherein a particular color of light is used to illuminate said document, such that only that particular color of light is reflected from said document and background colors are thereby removed from said document; and
   wherein a wavelength of 570 nm may optionally be used for said light source to scan a black and white (B/W) document.

4. The system of claim 1, said light source comprising:
   a three primary color (wavelength) LED light pipe comprising:
      an LED package for emitting three primary colors of light, said LED packages consisting of three primary colors of LED chip, one chip per color, mounted on a substrate;
      a light pipe having a reflector for transmitting said LED light from a point source to a line source; and
      an envelop for housing said light pipe and for guiding light emitted therefrom to a particular direction, wherein the uniformity of said emitted light is controlled by a pattern formed on said reflector;
   wherein said three primary colors of LED are turned on in sequence in which a first illumination cycle turns on a first primary color of LED IC, a second illumination cycle turns on a second primary color of LED IC, and a third illumination cycle turns on a third primary color of LED IC.

5. The system of claim 1, said light source comprising:
   a white color (multiple wavelength) florescent lamp, said lamp capable of generating a wide spectrum of light (white);
   wherein said lamp is used as a black and white light source to scan a black and white (B/W) documents; and
   wherein said lamp is used as a color light source by filtering said white light with three primary color filters into three primary colors, said filter comprising a filter switch that provides in sequence a first illumination cycle for switching a first primary color filter toward said document, a second illumination cycle for switching a second primary color filter toward said document, and a third illumination cycle for switching a third primary color filter toward said document.

6. The system of claim 1 said light source comprising:
   a white color (multiple wavelength) cold cathode tube that is operable to generate a wide spectrum of light (white);
   wherein said tube is used as a black and white light source to scan a black and white (B/W) documents; and
   wherein said tube is used as a color light source by filtering said white light with three primary color filters into three primary colors, said filter comprising a filter switch that provides in sequence a first illumination cycle for switching a first primary color filter toward said document, a second illumination cycle for switching a second primary color filter toward said document, and a third illumination cycle for switching a third primary color filter toward said document.

7. The system of claim 1, said optical lens comprising:
a plano-cylindrical lens;
wherein one side of said plano-cylindrical lens is flat;
wherein an other side of said plano-cylindrical lens is curved;
wherein said curved side of said plano-cylindrical lens is positioned toward said document; and
wherein said flat side of said plano-cylindrical lens is positioned toward said SLA.

8. The system of claim 1, said optical lens comprising:
a plano-cylindrical lens having an extension to the width of a lens rectangular body;
wherein an image formed on the width of said rectangular body cannot be detected by said image sensor.

9. The system of claim 1, said optical lens comprising:
a plano-cylindrical lens having an extension to the thickness of a lens rectangular body;
wherein the focal point of said plano-cylindrical lens is moved from outside of said lens, either to said lens or to inside said lens, depending upon the thickness of a lens rectangular body.

10. The system of claim 1, said optical lens comprising:
a plano-cylindrical lens having an extension to the thickness of a lens rectangular body for correcting chromatic aberration of said SLA;
wherein the index of refraction is higher for shorter wavelengths which are focused closer to said lens than are longer wavelengths;
wherein a light trace from said document is to a curved lens face;
wherein a light trace from said SLA is to a flat lens face; and
wherein the focal point of said light trace from said document has an opposite sign of chromatic aberration to the focal point of said light trace from said SLA.

11. The system of claim 1, said optical lens comprising:
a plano-cylindrical lens which made of a glass material.

12. The system of claim 1, said optical lens comprising:
a plano-cylindrical lens which made of a transparent polycarbonate material.

13. The system of claim 1, said optical lens comprising:
a plano-cylindrical lens which made of a transparent acrylic material.

14. The system of claim 1, said SLA comprising:
a Selfoc lens array comprising a bundle of optical glass fibers having a graded index in an axial direction, said fibers arranged, bound together, and sandwiched by two fiber plates to form a rectangular SLA;
wherein the graded index of refraction for said optical glass may be controlled by ion exchange and exchange time during the production of said glass.

15. The system of claim 1, said SLA comprising:
a page width Selfoc lens array comprising a bundle of optical plastic fibers having a graded index in an axial direction, said fibers arranged, bound together, and sandwiched by two fiber plates to form a rectangular SLA.

16. The system of claim 1, said image sensor array comprising:
a printed circuit board having a plurality of image sensor ICs arranged end to end and butted together.

17. The system of claim 1, said image sensor array comprising:
a ceramic substrate having a plurality of image sensor ICs arranged end to end and butted together.

18. The system of claim 2, wherein a single color of light is produced by each light emitting diode (LED).

19. The system of claim 3, wherein a single color of light is produced by each light emitting diode (LED).

20. The system of claim 4, wherein one of three colors of light are produced by each of said light emitting diodes (LEDs); and wherein three primary colors of LED chips (R, G, B) are used to produce said color light source.

21. The system of claim 16, wherein said image sensor ICs comprise:
a plurality of phototransistor photodetector elements.

22. The system of claim 16, wherein said image sensor ICs comprise:
a plurality of photodiode photodetector elements.

23. The system of claim 16, wherein said image sensor ICs comprise:
a plurality of active pixel sensor (APS) photodetector elements;
wherein a signal produced by said active pixel sensor is read out by either of a corrected doubling sampling or differential voltage pickoff, image processing technique.

24. The system of claim 17, wherein said image sensor ICs comprise:
a plurality of phototransistor photodetector elements.

25. The system of claim 17, wherein said image sensor ICs comprise:
a plurality of photodiode photodetector elements.

26. The system of claim 17, wherein said image sensor ICs comprise:
a plurality of active pixel sensor (APS) photodetector elements;
wherein a signal produced by said active pixel sensor is read out by either of a corrected doubling sampling or differential voltage pickoff, image processing technique.

27. A long depth of focus contact image sensor (Lf-cis) module comprising:
a light source to illuminate an object document;
a plano-cylindrical lens to focus a document image to an object plane of a Selfoc Lens Array (SLA);
said SLA transferring said document image formed on said object plane thereof to an image sensor plane thereof;
a hybrid image sensor having a plurality of image sensors located in said image sensor plane to convert said document image to an electronic signal;
a case for housing said long depth of focus contact image sensor (Lf-cis) module; and
a stainless steel bracket to hold said case and to maintain an aligned optical path.

28. The system of claim 27, wherein said light source comprises:
a single color (wavelength) LED light bar comprising:
a plurality of LED chips and a plurality of resistance ICs mounted on a printed circuit board; and
a diffuser lens is mounted on a top of said LED chips to diffuse LED light to a uniform light source;
wherein a particular color of light is used to illuminate said document, such that only that particular color of light is reflected from said document and background colors are thereby removed from said document; and wherein a wavelength of 570 nm may optionally be used for said light source to scan a black and white (B/W) document.

29. The system of claim 27, wherein said light source comprises:
a single color (wavelength) LED light pipe comprising:
an LED package that emits a single color of light, said LED package consists of one or more LED chips mounted on a substrate;
a light pipe having a reflector for transmitting said LED light from a point source to a line source; and
an envelop for housing said light pipe and for guiding said light emitted therefrom to a particular direction, wherein the uniformity of said emitted light is controlled by a pattern formed on said reflector;
wherein a particular color of light is used to illuminate said document, such that only that particular color of light is reflected from said document and background colors are thereby removed from said document; and
wherein a wavelength of 570 nm may optionally be used for said light source to scan a black and white (B/W) document.

30. The system of claim 27, said light source comprising:
a three primary color (wavelength) LED light pipe comprising:
an LED package for emitting three primary colors of light said LED packages consisting of three primary colors of LED chip, one chip per color, mounted on a substrate;
a light pipe having a reflector for transmitting said LED light from a point source to a line source; and
an envelop for housing said light pipe and for guiding light emitted therefrom to a particular direction, wherein the uniformity of said emitted light is controlled by a pattern formed on said reflector;
wherein said three primary colors of LED are turned on in sequence in which a first illumination cycle turns on a first primary color of LED IC, a second illumination cycle turns on a second primary color of LED IC, and a third illumination cycle turns on a third primary color of LED IC.

31. The system of claim 27, said light source comprising:
a white color (multiple wavelength) florescent lamp, said lamp capable of generating a wide spectrum of light (white);
wherein said lamp is used as a black and white light source to scan a black and white (B/W) documents; and
wherein said lamp is used as a color light source by filtering said white light with three primary color filters into three primary colors, said filter comprising a filter switch that provides in sequence a first illumination cycle for switching a first primary color filter toward said document, a second illumination cycle for switching a second primary color filter toward said document, and a third illumination cycle for switching a third primary color filter toward said document.

32. The system of claim 27 said light source comprising:
a white color (multiple wavelength) cold cathode tube that is operable to generate a wide spectrum of light (white);
wherein said tube is used as a black and white light source to scan a black and white (B/W) documents; and
wherein said tube is used as a color light source by filtering said white light with three primary color filters into three primary colors, said filter comprising a filter switch that provides in sequence a first illumination cycle for switching a first primary color filter toward said document, a second illumination cycle for switching a second primary color filter toward said document, and a third illumination cycle for switching a third primary color filter toward said document.

33. The system of claim 27, said optical lens comprising:
a plano-cylindrical lens;
wherein one side of said plano-cylindrical lens is flat;
wherein an other side of said plano-cylindrical lens is curved;
wherein said curved side of said plano-cylindrical lens is positioned toward said document; and
wherein said flat side of said plano-cylindrical lens is positioned toward said SLA.

34. The system of claim 27, said optical lens comprising:
a plano-cylindrical lens having an extension to the width of a lens rectangular body;
wherein an image formed on the width of said rectangular body cannot be detected by said image sensor.

35. The system of claim 27, said optical lens comprising:
a plano-cylindrical lens having an extension to the thickness of a lens rectangular body;
wherein the focal point of said plano-cylindrical lens is moved from outside of said lens, either to said lens or to inside said lens, depending upon the thickness of a lens rectangular body.

36. The system of claim 27, said optical lens comprising:
a plano-cylindrical lens having an extension to the thickness of a lens rectangular body for correcting chromatic aberration of said SLA;
wherein the index of refraction is higher for shorter wavelengths which are focused closer to said lens than are longer wavelengths;
wherein a light trace from said document is to a curved lens face;
wherein a light trace from said SLA is to a flat lens face; and
wherein the focal point of said light trace from said document has an opposite sign of chromatic aberration to the focal point of said light trace from said SLA.

37. The system of claim 27, said optical lens comprising:
a plano-cylindrical lens which made of a glass material.

38. The system of claim 27, said optical lens comprising:
a plano-cylindrical lens which made of a transparent polycarbonate material.

39. The system of claim 27, said optical lens comprising:
a plano-cylindrical lens which made of a transparent acrylic material.

40. The system of claim 27, said SLA comprising:
a Selfoc lens array comprising a bundle of optical glass fibers having a graded index in an axial direction, said fibers arranged, bound together, and sandwiched by two fiber plates to form a rectangular SLA;
wherein the graded index of refraction for said optical glass may be controlled by ion exchange and exchange time during the production of said glass.

41. The system of claim 27, said SLA comprising:
a page width Selfoc lens array comprising a bundle of optical plastic fibers having a graded index in an axial direction, said fibers arranged, bound together, and sandwiched by two fiber plates to form a rectangular SLA.

42. The system of claim 27, said image sensor array comprising:
a printed circuit board having a plurality of image sensor ICs arranged end to end and butted together.

43. The system of claim 27, said image sensor array comprising:
a ceramic substrate having a plurality of image sensor ICs arranged end to end and butted together.

44. The system of claim 27, wherein said case is a plastic case for housing said system in a compact size and light weight module;
wherein both ends of said plastic case are higher than the rest of said module;
wherein both ends of said module contact a bottom surface of a flatbed scanner glass;
wherein a constant optical distance is maintained between said scanner glass surface and said image sensor array; and
wherein said case is optionally made of a black, polycarbonate material having a glass fill to eliminate any light reflection in an optical path.

45. The system of claim 27, wherein said case is an aluminum case for housing said system in a compact size and light weight module;
wherein two sides of said aluminum case are each covered an end cap;
wherein said end cap is taller than the rest of said module;
wherein said end caps each contact a bottom surface of a flatbed scanner glass;;
wherein a constant optical distance is maintained between said scanner glass surface and said image sensor array; and
wherein said case is optionally black anodized to eliminate any light reflection in an optical path.

46. The system of claim 27, wherein said steel bracket is made of stainless steel.

47. The system of claim 28, wherein a single color of light is produced by each light emitting diode (LED).

48. The system of claim 29, wherein a single color of light is produced by each light emitting diode (LED).

49. The system of claim 30, wherein one of three colors of light are produced by each of said light emitting diodes (LEDs); and wherein three primary colors of LED chips (R, G, B) are used to produce said color light source.

50. The system of claim 42, wherein said image sensor ICs comprise:
a plurality of phototransistor photodetector elements.

51. The system of claim 42, wherein said image sensor ICs comprise:
a plurality of photodiode photodetector elements.

52. The system of claim 42, wherein said image sensor ICs comprise:
a plurality of active pixel sensor (APS) photodetector elements;
wherein a signal produced by said active pixel sensor is read out by either of a corrected doubling sampling or differential voltage pickoff, image processing technique.

53. The system of claim 43, wherein said image sensor ICs comprise:
a plurality of phototransistor photodetector elements.

54. The system of claim 43, wherein said image sensor ICs comprise:
a plurality of photodiode photodetector elements.

55. The system of claim 43, wherein said image sensor ICs comprise:
a plurality of active pixel sensor (APS) photodetector elements;
wherein a signal produced by said active pixel sensor is read out by either of a corrected doubling sampling or differential voltage pickoff, image processing technique.

56. The system of claim 46, wherein one or more notches are formed in the steel bracket to position and maintain said sensor in alignment and in contact with a bottom of said case; and
wherein said one or more notches are optionally used to contact a sensor ground plane to prevent Electronic Static Damage (ESD) problems.

57. The system of claim 46, wherein one or more punches on said steel bracket are used to hold a metal spring in alignment with an other side of said spring which is in contact with a metal carriage.

* * * * *